United States Patent
Anderson et al.

(10) Patent No.: US 9,631,870 B2
(45) Date of Patent: Apr. 25, 2017

(54) CURE CONTROL FOR CURABLE MATERIALS

(71) Applicant: The Boeing Company, Chicago, IL (US)

(72) Inventors: David Mitchell Anderson, Sammamish, WA (US); Thomas Trautmann McCleave, Mill Creek, WA (US)

(*) Notice: Subject to any disclaimer, the term of this patent is extended or adjusted under 35 U.S.C. 154(b) by 914 days.

(21) Appl. No.: 13/856,266

(22) Filed: Apr. 3, 2013

(65) Prior Publication Data
US 2014/0302446 A1 Oct. 9, 2014

(51) Int. Cl.
*F27D 19/00* (2006.01)

(52) U.S. Cl.
CPC ................... *F27D 19/00* (2013.01)

(58) Field of Classification Search
CPC ............... F27D 19/00; B29C 35/0288; B29C 2945/76892; B29C 35/0294; B29C 35/18; B29C 33/02
USPC .......................................... 700/198; 432/1, 6
See application file for complete search history.

(56) References Cited

U.S. PATENT DOCUMENTS

| | | | | |
|---|---|---|---|---|
| 4,819,177 A * | 4/1989 | Jurgensen | ............ | B29C 35/0288 264/236 |
| 5,055,245 A * | 10/1991 | Hisatomi | ................ | B05B 13/06 264/315 |
| 5,207,956 A | 5/1993 | Kline et al. | | |
| 7,167,773 B2 * | 1/2007 | Schneider | ............ | B29C 35/0288 264/40.1 |
| 2003/0230673 A1 | 12/2003 | Comoglio | | |
| 2010/0024958 A1 * | 2/2010 | Sawicki | .................. | B29C 73/12 156/94 |
| 2012/0280415 A1 * | 11/2012 | Halford | ............... | B29C 35/0288 264/40.1 |

OTHER PUBLICATIONS

UK Intellectual Property Office Search Report, dated Aug. 29, 2014, regarding Application No. GB1404012.5, 6 pages.
IP Australia Patent Examination Report No. 1, issued Nov. 16, 2016, regarding Application No. 2014200588, 3 pages.

* cited by examiner

*Primary Examiner* — Robert Fennema
*Assistant Examiner* — Sivalingam Sivanesan
(74) *Attorney, Agent, or Firm* — Yee & Associates, P.C.

(57) ABSTRACT

A method and apparatus comprising a cure of a curable material. A cure of a curable material is initiated by using cure parameters. The cure parameters are based on material data related to curing the curable material. Temperature values are obtained based on temperatures measured periodically during the cure by a plurality of sensors. A cure setting is adjusted during the cure based on at least one cure parameter of the cure parameters and at least one temperature value of the temperature values to substantially maintain a desired effect. The cure parameters comprise a hot threshold, a cold threshold, a hot alarm, and cold alarm.

55 Claims, 18 Drawing Sheets

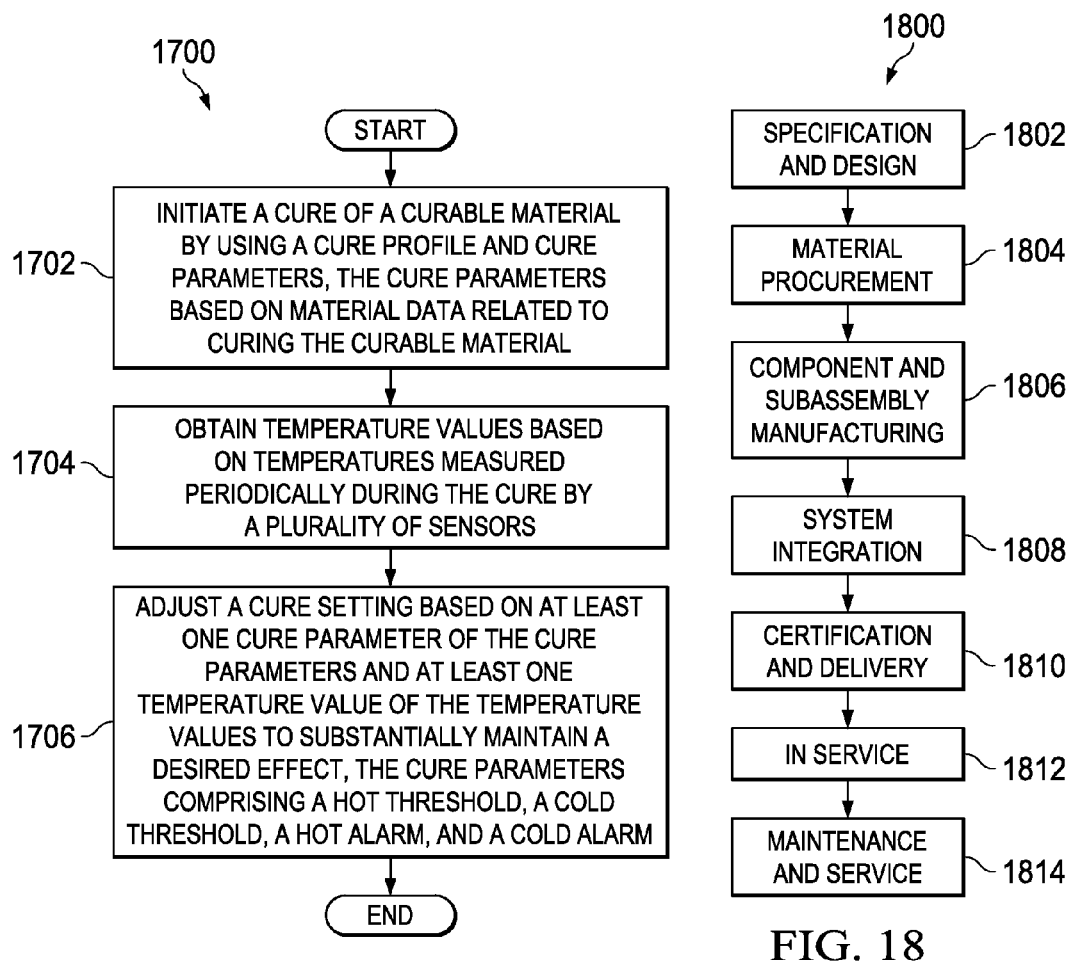
FIG. 17
FIG. 18
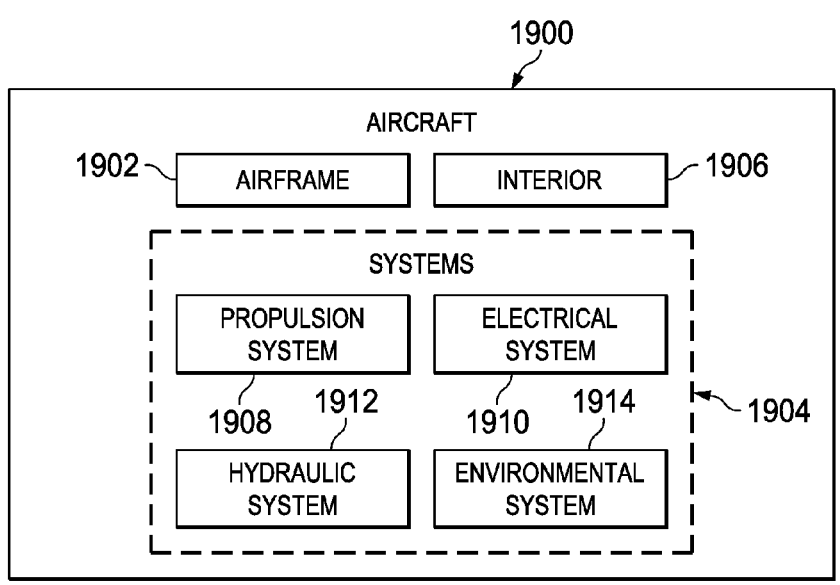
FIG. 19

CURE CONTROL FOR CURABLE MATERIALS

BACKGROUND INFORMATION

1. Field

The present disclosure relates generally to curable materials and, in particular, to controlling a cure of curable materials. Still more particularly, the present disclosure relates to a method and apparatus for controlling a cure of a curable material based on cure parameters.

2. Background

Structures may sometimes be manufactured, maintained, or reworked using curable materials. Following placement of a curable material on the structure, the curable material may be cured.

Conventional cure cycles have a temperature profile and a cure time. The time for curing the curable material may be longer than necessary to achieve a desired degree of cure in the curable material.

In some structures, associated structures may affect or be affected by the cure cycle. In some environments, the temperature of the environment may affect the cure cycle. As a result, a cure cycle may not proceed as anticipated. In some cases, not all portions of the curable material may achieve the same temperature. Some portions of the curable material may exceed a desired temperature while some portions of the curable material may not reach a desired temperature.

Therefore, it would be desirable to have a method and apparatus that take into account at least some of the issues discussed above, as well as other possible issues.

SUMMARY

In an illustrative embodiment, a method is presented. A cure of a curable material is initiated by using a cure profile and cure parameters. The cure parameters are based on material data related to curing the curable material. Temperature values are obtained based on temperatures measured periodically during the cure by a plurality of sensors. A cure setting is adjusted during the cure based on at least one cure parameter of the cure parameters and at least one temperature value of the temperature values to substantially maintain a desired effect. The cure parameters comprise a hot threshold, a cold threshold, a hot alarm, and cold alarm.

In another illustrative embodiment, a system is presented. The system comprises a heating system, a plurality of sensors, and a cure controller. The plurality of sensors is associated with a curable material. The plurality of sensors is configured to measure temperatures at a plurality of locations of the curable material. The cure controller is configured to initiate a cure of the curable material using a cure profile, cure parameters, and the heating system. The cure parameters are based on material data related to curing the curable material. The cure controller is also configured to obtain temperature values based on the temperatures measured periodically during the cure by the plurality of sensors. The cure controller is further configured to adjust a cure setting during the cure based on at least one cure parameter of the cure parameters and at least one temperature value of the temperature values to substantially maintain a desired effect. The cure parameters comprise a hot threshold, a cold threshold, a hot alarm, and cold alarm.

In yet another illustrative embodiment, a method is presented. Material data related to curing a curable material is gathered. Cure parameters are established. At least one of the cure parameters is dependent on the material data related to curing the curable material. The cure parameters include a hot threshold, a cold threshold, a hot alarm, and a cold alarm. A cure profile is established, the cure profile being divided into a plurality of segments wherein each of the plurality of segments comprises at least one of a ramp segment or a hold segment. A cure of the curable material is initiated using the cure profile and cure parameters. Temperatures from a plurality of sensors are measured periodically during the cure. Temperature values are obtained based on the temperatures measured by the plurality of sensors. A determination is made whether any temperature values from the plurality of sensors from a single reading are near or exceeds at least one of the cold threshold or the hot threshold. A controller mode is selected based on a result of the determining step. The cure setting is adjusted during the cure based on at least one of the cure parameters and at least one of the temperature values using the controller mode to substantially maintain a desired effect. Adjusting the cure setting comprises changing at least one of a cure time or a heater setting. Changing the cure time comprises adding a segment extension after a segment in the plurality of segments or decreasing a time for a segment in the plurality of segments. A new estimated cure time is determined in response to changing the cure time. The new estimated cure time is displayed in response to determining the new estimated cure time.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 17 is an illustration of a flowchart of a process for controlling a cure in accordance with an illustrative embodiment;

FIG. 18 is an illustration of an aircraft manufacturing and service method in the form of a block diagram in accordance with an illustrative embodiment; and FIG. 19 is an illustration of an aircraft in the form of a block diagram in which an illustrative embodiment may be implemented.

DETAILED DESCRIPTION

Figure 1:
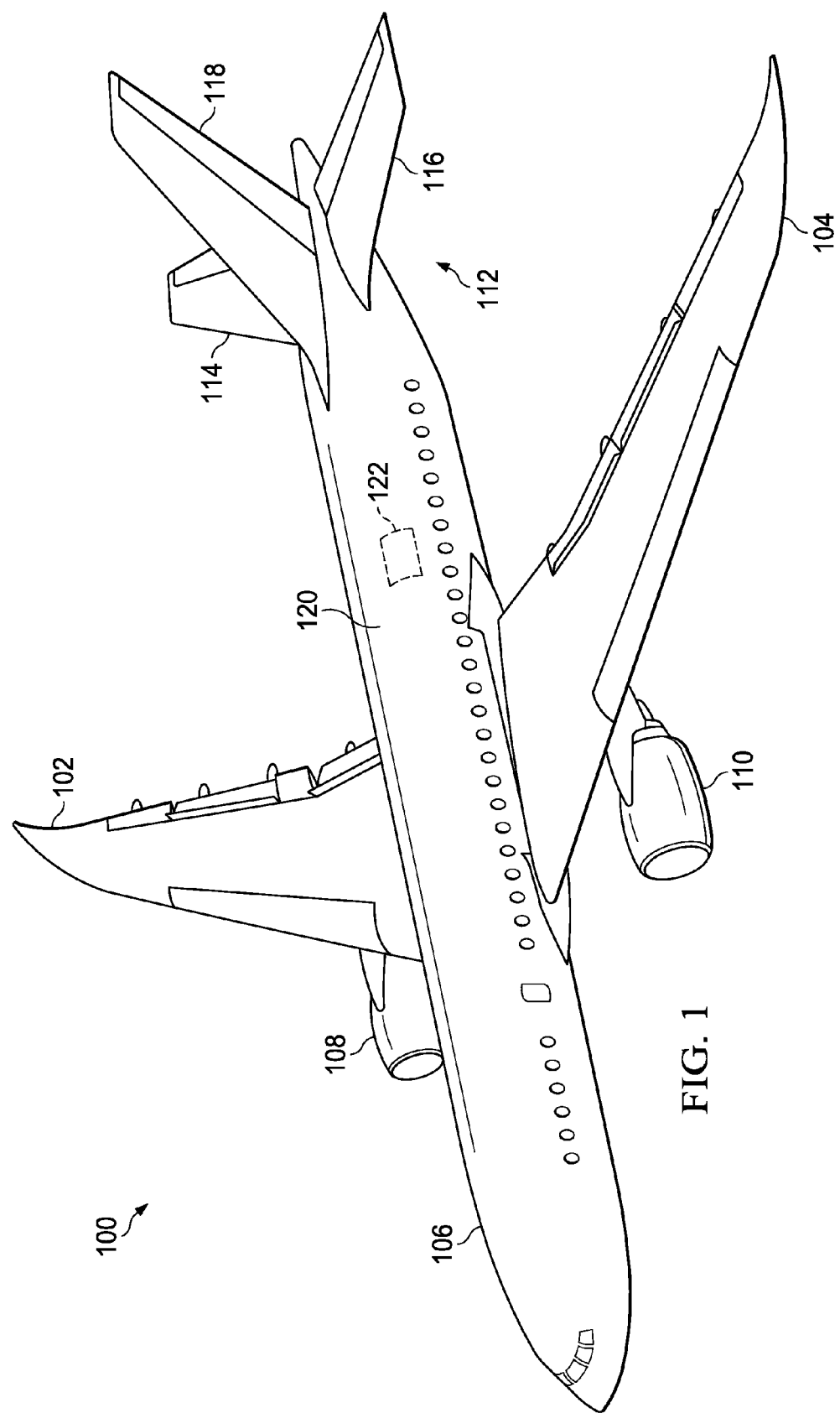
FIG. 1 is an illustration of an aircraft in which an illustrative embodiment may be implemented.

The different illustrative embodiments recognize and take into account one or more different considerations. For example, the illustrative embodiments recognize and take into account the time associated with conventional curable material cure cycles may be undesirably high. The illustrative embodiments further recognize and take into account a cure controller capable of executing a cure according to a nontraditional cure profile may produce a time savings.

The illustrative embodiments recognize and take into account associated structures may cause large variations in temperatures in a curable material. The illustrative embodiments recognize and take into account a structure may cause large variations in temperatures in a curable material due to thermal non-uniformities. Thermal non-uniformities may be a result of at least one of structural geometries, variations in thermal conductivity, variations in thermal convection, variations in thermal contact resistance, non-isotropic materials, inconsistencies in materials, or other suitable characteristics.

The illustrative embodiments recognize and take into account that non-uniform temperature in a curable material during curing may traditionally be addressed by a human worker. The illustrative embodiments recognize and take into account this human decision making may introduce errors.

The illustrative embodiments also recognize and take into account the temperature at which a curable material is heated influences the time to reach approximately 99% degree of cure. The illustrative embodiments also recognize and take into account the speed at which a curable material is heated may affect the degree of variation in temperatures in the curable material. Likewise, the illustrative embodiments recognize and take into account the speed at which a curable material is heated may affect the resulting material properties of the cured curable material.

The illustrative embodiments also recognize and take into account uncured curable material may be more easily removed than cured material. As a result, the illustrative embodiments recognize and take into account identifying curable materials unable to cure according to cure parameters prior to completion of the cure cycle may result in a savings of at least one of time costs or labor costs.

The illustrative embodiments further recognize and take into account there may be a desirable range of temperatures for curing a curable material. The illustrative embodiments also recognize and take into account that falling below the desirable range of temperatures may influence material properties of the cured curable material to a greater degree than rising above the desirable range of temperatures. As a result, the illustrative embodiments recognize and take into account that maintaining a minimum curing temperature may be more important to material characteristics of a cured curable material than maintaining a maximum curing temperature.

The illustrative embodiments further recognize and take into account driving a cure cycle using only a temperature profile may produce undesirable results. The illustrative embodiments further recognize and take into account a cure controller capable of increasing or decreasing the time of a cure based on the cure history may produce a time savings. The illustrative embodiments further recognize and take into account a cure controller capable of increasing or decreasing the time of a cure based on cure history may provide a cost savings in reducing undesirable characteristics of a cured material.

Thus, the different illustrative embodiments provide an apparatus and method for curing curable materials. In particular, the different illustrative embodiments provide a method for curing curable materials without increasing at least one of the time, labor, or cost for rework or manufacturing of a platform more than desired.

With reference now to the figures, and in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft in which cure control for curable materials may be implemented in accordance with an illustrative embodiment. In one illustrative example, body 106 of aircraft 100 may have skin 120. Skin 120 may have one or more inconsistencies in an area, such as area 122. Inconsistencies may include at least one of cracks, particles, shape deformities, holes, or other undesirable conditions of skin 120. In some illustrative examples, area 122 may receive a rework using curable materials to restore area 122. In this illustrative example, the curable material comprises a rework patch. Curing the curable material results in a completed rework of a structure, in this case area 122 of skin 120.

In another illustrative example, curable materials may be added to skin 120 during manufacturing or maintenance. In this illustrative example, curable materials may be added as coatings on skin 120, doublers comprising portions of skin 120, or any other suitable curable material.

Figure 2:
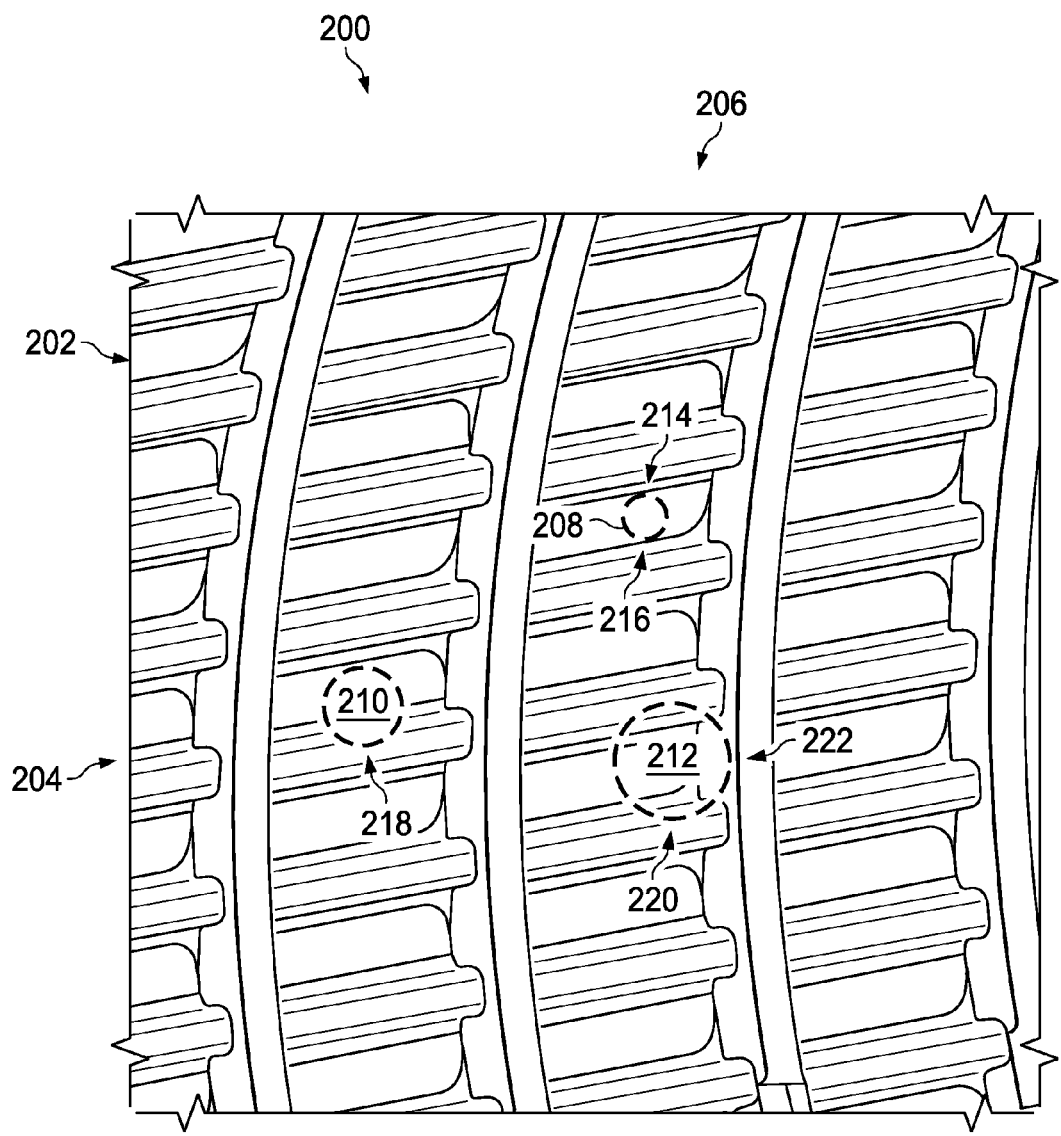
FIG. 2 is an illustration of a portion of an aircraft with areas undergoing rework in accordance with an illustrative embodiment.

Turning now to FIG. 2, an illustration of an area of an aircraft with areas with curable materials is depicted in accordance with an illustrative embodiment. Area 200 may be an example of an implementation of area 122 of FIG. 1.

Area 200 comprises skin 202, stringers 204, and frame members 206. As depicted, skin 202 has area 208, area 210, and area 212. Area 208, area 210, and area 212 may be areas using curable materials.

Skin 202 may affect the heating of curable materials added to skin 202. In one illustrative example, skin 202 may have changes in material composition along skin 202. These material changes may affect the rate of heating of a curable material added to skin 202. These material changes may affect the distribution of heat within the curable material added to skin 202. In another illustrative example, skin 202 may comprise a non-isotropic material. The non-isotropic nature of skin 202 may affect the rate of heating of a curable material added to skin 202. The non-isotropic nature of skin 202 may affect the distribution of heat within a curable material added to skin 202.

As depicted, each of area 208, area 210, and area 212 is positioned differently relative to stringers 204 and frame members 206. Area 208 is between stringer 214 and stringer 216 of stringers 204. Area 210 is over a portion of stringer 218 of stringers 204. Area 212 is over a portion of stringer 218 and a portion of stringer 220 of stringers 204. Area 212 is also over frame member 222 of frame members 206.

Stringers 204 and frame members 206 may affect the heating of curable materials added to skin 202. Specifically, differences in position of area 208, area 210, and area 212 relative to stringers 204 and frame members 206, may cause curable materials over each of area 208, area 210, and area 212 to heat differently from each other. For example, frame member 222 may affect the heating of a curable material applied over area 212. In another illustrative example, stringer 218 may affect the heating of a curable material placed over area 210. In yet another illustrative example, heating a curable material placed over area 210 may not be affected by either stringer 214 or stringer 216. As a result, curable materials over each of area 208, area 210, and area 212 may heat differently from each other.

Further, the position of area 208, area 210, and area 212 relative to stringers 204 and frame members 206 may lead to temperature variations within curable materials over each of area 208, area 210, and area 212. For example, frame member 222 may act as a heat sink, causing the area of curable material positioned over frame member 222 in area 212 to be a lower temperature than other portions of the curable material over only skin 202 in area 212.

A distribution of heat in a curable material positioned over area 212 during curing may be affected by at least one of structural geometries of skin 202, stringer 220, and frame member 222; variations in thermal conductivity in any of skin 202, stringer 220, and frame member 222; variations in thermal convection in any of skin 202, stringer 220, and frame member 222; variations in thermal contact resistance in any of skin 202, stringer 220, and frame member 222; inconsistencies in any of skin 202, stringer 220, and frame member 222; or other suitable characteristics. As a result, a curable material positioned over area 212 during curing may have a non-uniform temperature.

A distribution of heat in a curable material positioned over area 208 during curing may be affected by at least one of structural geometries of skin 202, variations in thermal conductivity of skin 202, variations in thermal convection of skin 202, variations in thermal contact resistance of skin 202, inconsistencies of skin 202, or other suitable characteristics. As a result, a curable material positioned over area 208 during curing may have a non-uniform temperature.

Further, in some illustrative examples, surrounding structures may affect a distribution of heat in a curable material during curing even if the curable material does not directly overlie the surrounding structures. In one illustrative example, stringer 214, stringer 216, and frame member 222 may affect the distribution of heat in a curable material positioned over area 208 although area 208 does not overlie stringer 214, stringer 216, or frame member 222.

Yet further, stringers 204 and frame members 206 may be affected by curing processes for curable materials on skin 202. In one illustrative example, stringer 218 may be heated as a result of heating a curable material over area 210. In some illustrative examples, stringer 218 may be a heat sensitive material. In these illustrative examples, if stringer 218 receives an undesirable amount of heat from heating a curable material over area 210, stringer 218 may be adversely affected. For example, stringer 218 may develop inconsistencies.

The illustration of area 200 in FIG. 2 is not meant to imply physical or architectural limitations to the manner in which an illustrative embodiment may be implemented. For example, although area 200 is depicted as skin 202 with stringers 204 and frame members 206, in some illustrative examples, area 200 may only include skin 202. In other illustrative examples, area 200 may include a door, window, or other structure. In yet other illustrative examples, area 200 may take the form of a structure other than skin 202.

Further, in some illustrative examples, curable material may be applied to other structures than skin 202. For example, curable material may be applied to at least one of stringers 204 and frame members 206. As another illustrative example, a stringer in stringers 204, a frame member of frame members 206, a portion of a stringer in stringers 204, or a portion of a frame member of frame members 206 may be the curable material. In yet another illustrative example, skin 202 or a part of skin 202 may be a curable material.

Figure 3:
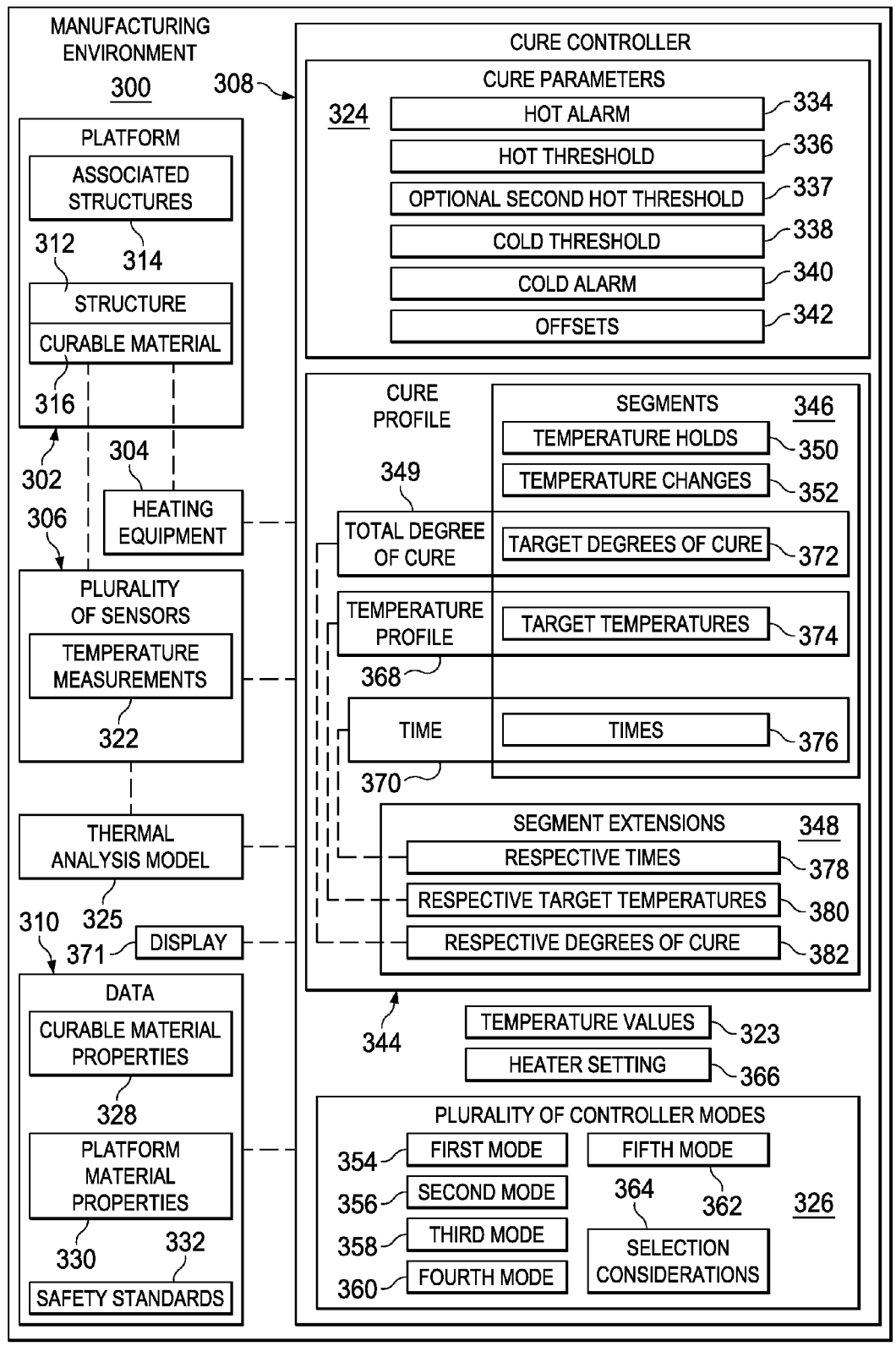
FIG. 3 is an illustration of a block diagram of a manufacturing environment in accordance with an illustrative embodiment.

With reference now to FIG. 3, an illustration of a block diagram of a manufacturing environment is depicted in accordance with an illustrative embodiment. Manufacturing environment 300 may be an example of an environment in which components of aircraft 100 of FIG. 1 may be manufactured, reworked, maintained, or serviced. Manufacturing environment 300 has platform 302, heating equipment 304, plurality of sensors 306, cure controller 308, and data 310.

In FIG. 3, platform 302 may be one implementation of the aircraft 100 in FIG. 1. Although the illustrative examples for an illustrative embodiment are described with respect to an aircraft, an illustrative embodiment may be applied to other types of platforms. Platform 302, may be for example, without limitation, a mobile platform, a stationary platform, a land-based structure, an aquatic-based structure, and a space-based structure. More specifically, platform 302, may be a surface ship, a tank, a personnel carrier, a train, a spacecraft, a submarine, an automobile, a power plant, a bridge, a dam, a house, a manufacturing facility, a building, or other suitable platforms.

Platform 302 has structure 312, associated structures 314, and curable material 316. Curable material 316 may be placed over structure 312 and cured. In some illustrative examples, structure 312 may first be prepared for receiving curable material 316 by at least one of cleaning, surface treatments, removal of portions of structure 312, or other suitable actions.

As used herein, the phrase "at least one of," when used with a list of items, means different combinations of one or more of the listed items may be used and only one of each item in the list may be needed. For example, "at least one of item A, item B, and item C" may include, without limitation, item A or item A and item B. This example also may include item A, item B, and item C or item B and item C. The item may be a particular object, thing, or a category. In other words, at least one of means any combination of items and number of items may be used from the list but not all of the items in the list are required.

After placement of curable material 316 on structure 312, curable material 316 may be cured using heating equipment 304. Heating equipment 304 may apply heat to curable material 316 to cure curable material 316. Heating equipment 304 may include at least one of an autoclave, a heating pad, an iron, an oven, or other suitable heating equipment. As a result of the proximity of structure 312 and associated structures 314 to curable material 316, heating equipment 304 may also heat structure 312 and associated structures 314 while heating curable material 316.

Associated structures 314 are structures of platform 302 which are thermally associated with structure 312. As used herein, a first item may be considered to be thermally associated with a second item when the first item is affected by heating of the second item, when the first item affects the heating of the second item, or both. In some illustrative examples, associated structures 314 may affect the heating of curable material 316 by heating equipment 304. In some illustrative examples, associated structures 314 may be affected by the heating of curable material 316 by heating equipment 304.

As a result of at least one of structure 312, associated structures 314, or heating equipment 304, curable material 316 may not be uniformly heated. In one illustrative example, at least one of the geometry of structure 312, the material of structure 312, variations in thermal conductivity, variations in thermal convection, variations in thermal contact resistance, inconsistencies in materials, or other suitable characteristics may cause non-uniform temperature in curable material 316 during heating.

Non-uniform temperature within curable material 316 may affect material properties of curable material 316 after cure. For example, reducing the cure temperature may cause curable material 316 to have reduced bond strength with structure 312. Increasing the cure temperature may cause curable material 316 to have greater brittleness but increased bond strength. As a result, monitoring temperatures in a plurality of portions of curable material 316 during cure may be desirable.

Plurality of sensors 306 are configured to measure temperatures of a plurality of portions of curable material 316 during cure. Plurality of sensors 306 produce temperature measurements 322 during cure of curable material 316. Temperature measurements 322 may include temperature measurements taken on a periodic basis.

In one illustrative example, plurality of sensors 306 may measure the temperature of portions of curable material 316 at a first time. In some illustrative examples, the highest temperature measurement at the first time may not be the highest temperature experienced by curable material 316 at this first time. In some illustrative examples, cure parameters 324 may be configured to take into account that curable material 316 may experience higher temperatures than the highest temperature measurement.

Cure controller 308 is configured to control a cure of curable material 316. Cure controller 308 is configured to control a cure of curable material 316 by controlling heating equipment 304.

Cure controller 308 may control a cure of curable material 316 based on temperature values 323. Temperature values 323 may be obtained based on temperature measurements 322 taken periodically during the cure by a plurality of sensors 306. In some illustrative examples, temperature values 323 may be the same as temperature measurements 322. In some illustrative examples, temperature values 323 may be values obtained using temperature measurements 322 and thermal analysis model 325.

In some illustrative examples, for each temperature measurement in temperature measurements 322, there will be a respective temperature value in temperature values 323. In some illustrative examples, there may only be a respective temperature value in temperature values 323 for a highest temperature measurement and a lowest temperature measurement in temperature measurements 322 at a first time.

Cure controller 308 may control a cure of curable material 316 by adjusting cure settings. Cure controller 308 may adjust cure settings to maintain a desired effect. In some illustrative examples, the desired effect may involve at least one cure parameter of cure parameters 324 and at least one temperature value of temperature values 323. The desired effect may include at least one of maintaining temperature values 323 above cold alarm 340, maintaining temperature values 323 above cold threshold 338, maintaining temperature values 323 below hot alarm 334, maintaining temperature values 323 below hot threshold 336, centering temperature values 323 within hot threshold 336 and cold threshold 338, or other suitable effects.

Adjusting cure settings may include at least one of changing heater setting 366, changing time 370, or other suitable adjustments. Cure controller 308 then controls heating equipment 304 according to the cure settings. Controlling heating equipment 304 allows cure controller 308 to direct the cure for curable material 316. Cure controller 308 comprises cure parameters 324, cure profile 344, heater setting 366, and plurality of controller modes 326.

Cure controller 308 may control the cure based on at least one cure parameter of cure parameters 324. In some illustrative embodiments, cure controller 308 controls heating equipment 304 based on at least one cure parameter of cure parameters 324 and at least one temperature value of temperature values 323.

At least one of cure parameters 324 is based on data 310. Data 310 includes curable material properties 328, platform material properties 330, and safety standards 332. Curable material properties 328 may be properties related to curing of curable material 316. In some illustrative examples, curable material properties 328 include cure kinetic curves for curable material 316. In some illustrative examples, curable material properties 328 include values of at least one of bond strength, brittleness, or other bond properties for curable material 316 for a plurality of cure temperatures.

Cure parameters 324 include hot alarm 334, hot threshold 336, cold threshold 338, cold alarm 340, and offsets 342. As depicted, cure parameters 324 also include optional second hot threshold 337, however in some illustrative examples, cure parameters 324 do not include optional second hot threshold 337.

To obtain desirable material properties for curable material 316, it is desirable for all temperatures to remain between hot threshold 336 and cold threshold 338 during cure of curable material 316. If all temperatures remain between hot threshold 336 and cold threshold 338 during cure, curable material 316 will have achieved a desirable degree of cure and other desirable material properties. As a result, curable material 316, with all temperatures remaining between hot threshold 336 and cold threshold 338 during cure, has a high likelihood of a bond with structure 312 having desirable properties.

Hot alarm 334 may be a temperature value over which curable material 316 may have undesirable material properties. In some illustrative examples, cure of curable material 316 may fail if a temperature breaches hot alarm 334. In some illustrative examples, hot alarm 334 may vary through a cure. In some illustrative examples, hot alarm 334 may remain the same value throughout cure. In some illustrative examples, hot alarm 334 may be a value over which there may be manufacturing concerns.

For example, hot alarm 334 may be a value over which at least one associated structure of associated structures 314 may be damaged. In some illustrative examples, hot alarm 334 may be a value over which further manufacturing may be considered unsafe. For example, hot alarm 334 may be a value over which flammability may be a concern. In some illustrative examples, a cure may be automatically stopped after a temperature breaches the hot alarm 334.

Hot threshold 336 may be a temperature value over which desirable material properties of curable material 316 may not be obtained. In some illustrative examples, after the cure, curable material 316 with at least one temperature over hot threshold 336 may be evaluated to determine if the bond properties of curable material 316 are acceptable. In some illustrative examples, an acceptable cure of curable material 316 may still be obtained when at least one temperature value breaches hot threshold 336. In some illustrative examples, hot threshold 336 may vary through a cure. In some illustrative examples, hot threshold 336 may remain the same value throughout cure.

Cold threshold 338 may be a value under which desirable material properties of curable material 316 may not be obtained. In some illustrative examples, after the cure, curable material 316 with at least one temperature under cold threshold 338 may be evaluated to determine if the bond properties of curable material 316 are acceptable. In some illustrative examples, an acceptable cure of curable material 316 may still be obtained when at least one temperature value breaches cold threshold 338. In some illustrative examples, cold threshold 338 may vary through a cure. In some illustrative examples, cold threshold 338 may remain the same value throughout cure.

Cold alarm 340 may be a value under which curable material 316 may have undesirable material properties. In some illustrative examples, the cure of curable material 316 with at least one temperature below cold alarm 340 may be deemed to be too long to be practical. In some illustrative examples, curable material 316 with temperature values below cold alarm 340 may have undesirable characteristics. In some illustrative examples, after the cure, curable material 316 with at least one temperature under cold alarm 340 may be evaluated to determine if the bond properties of curable material 316 are acceptable. In some illustrative examples, cold alarm 340 may vary through a cure. In some illustrative examples, cold alarm 340 may remain the same value throughout cure.

Offsets 342 may be values which cure controller may use in changing heater setting 366. In some illustrative examples, offsets 342 may be values slightly above or slightly below cure parameters 324. In one illustrative example, an offset in offsets 342 may be slightly below hot threshold 336. As another illustrative example, an offset in offsets 342 may be slightly above cold threshold 338. In yet another illustrative example, an offset in offsets 342 may be slightly below hot alarm 334. In another illustrative example, an offset in offsets 342 may be slightly above cold alarm 340. Offsets 342 may be used to determine if a temperature value of temperature values 323 is near another cure parameter of cure parameters 324. In one illustrative example, an offset in offsets 342 may be used to determine if a temperature value of temperature values 323 is near hot threshold 336.

In some illustrative examples, offsets 342 need not be near other cure parameters in cure parameters 324. In some illustrative examples, an offset in offsets 342 may be near temperature profile 368.

Cure profile 344 comprises temperature profile 368, time 370, and total degree of cure 349 for a cure of curable material 316. Temperature profile 368 may vary through cure of curable material 316. As a result, cure profile 344 may be at least one of linear, non-linear, curved, or any other suitable shape.

In some illustrative examples, cure profile 344 may include features configured to identify a curable material which may fail to cure using cure profile 344. In some illustrative examples, cure profile 344 may be completed in less time than a traditional cure profile.

Time 370 may comprise an estimated cure time for cure profile 344. In some illustrative examples, time 370 may be displayed in association with initiating cure profile 344. Time 370 may displayed on display 371. Display 371 may take the form of a projector and projecting surface; a screen associated with a computer, cell phone, PDA, cure controller 308, or other manufacturing equipment; or any other suitable display type.

Time 370 may have an initial value prior to beginning a cure. As a cure is executed using cure profile 344, time 370 may be changed based on at least one of a cure parameter of cure parameters 324 and a temperature value of temperature values 323. Time 370 may be increased or decreased. Time 370 may be changed by any appropriate measure. In some illustrative examples, time 370 may be changed multiple times during a cure. In one illustrative example, as a cure is executed using cure profile 344, a temperature value of temperature values 323 may fall below cold threshold 338. In this illustrative example, time 370 may be then increased. In one illustrative example, as a cure is executed using cure profile 344, a segment of segments 346 may fail to achieve its respective target degree of cure in target degrees of cure 372. In this illustrative example, time 370 may be increased to achieve the target degree of cure in target degrees of cure 372 for the segment in segments 346 before proceeding to the next segment in segments 346.

Cure profile 344 may be referred to as dynamic. Cure profile 344 may be referred to as dynamic because at least one of temperature profile 368 and time 370 may change during cure of curable material 316.

Cure profile also has total degree of cure 349. Total degree of cure 349 is a desired value of a degree of cure for cure profile 344. A degree of cure is an extent to which curing has progressed in curable material 316. In some illustrative examples, total degree of cure 349 may be 99%. Curable material 316 which reaches 99% degree of cure may be referred to as "fully cured." In some illustrative examples, a degree of cure may be indicative of the amount of degree of cure present in curable material 316. As used herein, a degree of cure may also be referred to as a percentage cure.

Cure profile 344 includes segments 346 and segment extensions 348. Segments 346 are portions of cure profile 344. Segments 346 have times 376. Times 376 are portions of time 370 of cure profile 344. Each segment of segments 346 has a respective time in times 376. Accordingly, each segment in segments 346 is a portion of time 370 within cure profile 344. In some illustrative examples, times 376 may all be the same length. In other words, in some illustrative examples, all segments 346 may have the same length of time. In some illustrative examples, times 376 may include different lengths of time. For example, a first segment in segments 346 may be 5 minutes in length while a second segment in segments 346 may be 10 minutes in length.

Segments 346 have target temperatures 374. Target temperatures 374 are portions of temperature profile 368. Each segment of segments 346 has a respective target temperature in target temperatures 374. Accordingly, each segment in segments 346 is a portion of temperature profile 368 within cure profile 344. Segments 346 include temperature holds 350 and temperature changes 352. Temperature holds 350 are segments in segments 346 in which the respective target temperature remains the same throughout the segment. Temperature holds 350 may also be referred to as hold segments. Temperature changes 352 are segments in segments 346 in which the respective target temperature increases or decreases through the segment. Temperature changes 352 may also be referred to as ramp segments. Ramp segments which decrease in temperature may also be referred to as cool down segments. Temperature changes 352 may be linear or non-linear increases or decreases in temperature.

Segments 346 have target degrees of cure 372. Target temperatures 374 are portions of total degree of cure 349. Each segment of segments 346 has a respective target degree of cure in target degrees of cure 372. Accordingly, each segment in segments 346 is a portion of total degree of cure 349 within cure profile 344.

In some illustrative examples, target degrees of cure 372 may all have the same value. In one illustrative example, total degree of cure 349 may be approximately 99% degree of cure. In this illustrative example, segments 346 may comprise 100 segments. In this illustrative example, each segment in segments 346 may have a respective target degree of cure of approximately 1%. In some illustrative examples, target degrees of cure 372 may have different values. In some illustrative examples, a segment in segments 346 may have a 0% target degree of cure.

An achieved degree of cure during a segment in segments 346 may be determined based on temperature values in temperature values during the segment. In some illustrative examples, an achieved degree of cure is determined based on a cure kinetics curve for curable material 316.

Segments 346 may include any desirable number of segments. Segments 346 may include from one to hundreds of segments. However, a length of time for a segment in segments 346 should not be smaller than a time to observe a thermal response of curable material 316 in response to a change to heating equipment 304.

Segment extensions 348 are portions which may be added to cure profile 344. Segment extensions 348 may also be referred to as time extensions or cure segment extensions. A segment extension of segment extensions 348 may be added after a segment of segments 346. In some illustrative examples, a segment extension of segment extensions 348 may be added after a segment in segments 346 in response to at least one temperature value falling below at least one of cold threshold 338 or cold alarm 340 during the segment in segments 346. In some illustrative examples, a segment extension of segment extensions 348 may be added in response to a segment in segments 346 failing to achieve its respective target degree of cure in total degree of cure 349. Segment extensions 348 may have respective times 378, respective target temperatures 380, and respective degrees of cure 382.

In some illustrative examples, a segment extension of segment extensions 348 may be added after a segment in segments 346 which failed to reach its respective target degree of cure. The segment extension may be configured to provide the difference in degree of cure between the segment's achieved degree of cure and the segment's respective target degree of cure. In these illustrative examples, the segment and the segment extension together may provide the target degree of cure before moving on to the next segment in segments 346. If the segment extension fails to provide the difference in degree of cure, an additional segment extension may be added.

In some illustrative examples, respective target temperatures 380 and respective times 378 for segment extensions 348 may be determined based on curable material properties 328. In one illustrative example, a segment of segments 346 may fail to achieve its respective target degree of cure in target degrees of cure 372. In this illustrative example, based on a cure kinetic curve in curable material properties 328, the achieved degree of cure for the segment in segments 346 may be determined. The difference between the achieved degree of cure and the respective target degree of cure in target degrees of cure 372 may then be determined. In this illustrative example, the target temperature and length of time of a segment extension in segment extensions 348 may be calculated to achieve a degree of cure equal to the difference between the achieved degree of cure and the respective target degree of cure in target degrees of cure 372. In this illustrative example, by adding the segment extension in segment extensions 348 after the segment of segments 346, the respective target degree of cure in total degree of cure 349 may be reached by the segment and the segment extension combined before proceeding to the next segment in segments 346.

In some illustrative examples, respective target temperatures 380 of segment extensions 348 may be the same as the target temperature of the preceding segment in segments 346. In some illustrative examples, respective target temperatures 380 of segment extensions 348 may be lower than the target temperature of the preceding segment in segments 346. In some illustrative examples, respective target temperatures 380 of segment extensions 348 may be higher than the target temperature of the preceding segment in segments 346. In some illustrative examples, segment extensions may have higher rates of temperature increase than the preceding segment in segments 346.

In some illustrative examples, segment extensions 348 may have lower rates of temperature increase than the preceding segment in segments 346. Higher rates of temperature increase may have larger divergences between a highest temperature value and a lowest temperature value than lower rates of temperature increase. In some illustrative examples, a time extension of segment extensions 348 may be added to raise a lowest temperature value. In some illustrative examples, a segment extension of segment extensions 348 may be added to raise a lowest temperature value above at least one of cold threshold 338 and cold alarm 340.

In some illustrative examples, a limited number of segment extensions 348 may be allowed to be added to cure profile 344. As one non-limiting example, only ten segment extensions 348 may be allowed to be added to cure profile 344. In some illustrative examples, a limited number of segment extensions 348 may be allowed after a segment of segments 346. The number of segment extensions 348 allowed after a segment in segments 346 may be the same for all segments in segments 346. The number of segment extensions 348 allowed after a segment in segments 346 may be different for all segments in segments 346. For example, a first segment of segments 346 may only allow two segment extensions 348 to be added after the first segment. As another example, a second segment of segments 346 may not allow any segment extensions 348 to be added after the second segment of segments 346.

In some illustrative examples, the total of respective times 378 added to cure profile 344 may be limited. As one non-limiting example, segment extensions 348 may be limited to only ten minutes total in respective times 378 added to cure profile 344. In some illustrative examples, the respective times 378 added after a segment in segments 346 may be limited. As one non-limiting example, segment extensions 348 may be limited to only two minutes total in respective times 378 added to a first segment in segments 346. In some illustrative examples, the respective times 378 limitation for each segment in segments 346 may be the same. In some illustrative examples, segments 346 may have different limitations for respective times 378.

Time 370 for curing curable material 316 using cure profile 344 may be increased as a result of using segment extensions 348. In some illustrative examples, cure controller 308 may identify a new estimated cure time for time 370 after use of a segment extension of segment extensions 348.

In some illustrative examples, a segment in segments 346 may reach its respective target degree of cure in total degree of cure 349 prior to the complete time of the segment. In some of these illustrative examples, the time of this segment in segments 346 may be reduced. In some of these illustrative examples, this segment in segments 346 may be ended upon reaching its respective target degree of cure in total degree of cure 349. As a result, time 370 for curing curable material 316 using cure profile 344 may be decreased. In some illustrative examples, cure controller 308 may identify a new estimated cure time for time 370 after reducing a time for a segment in segments 346.

In one illustrative example, the respective target degree of cure for a segment in segments 346 is 5% and the time for the segment is 12 minutes. If the achieved degree of cure reaches 5% after 8 minutes, the segment may be complete. The cure may then proceed to the next segment in segments 346. As a result, time 370 may be reduced by 4 minutes.

Plurality of controller modes 326 may be used by cure controller 308 to control heating equipment 304. Each of plurality of controller modes 326 may control heating equipment 304 using at least one of a temperature value of temperature values 323 and at least one cure parameter of cure parameters 324. A controller mode in plurality of controller modes 326 may be selected based on at least one of temperature values 323, cure parameters 324, or selection considerations 364. Selection considerations 364 may order plurality of controller modes 326 based on at least one of safety considerations, material properties considerations, operator identified considerations, or any other suitable considerations.

In some illustrative examples, selection of a controller mode of plurality of controller modes 326 may take place periodically throughout the cure of curable material 316 using cure profile 344. In some illustrative examples, a controller mode of plurality of controller modes 326 may be selected each time temperature measurements 322 are taken by plurality of sensors 306.

In some illustrative examples, selection of a controller mode of plurality of controller modes 326 may take place several times during a segment of segments 346. In some illustrative examples, a same controller mode of plurality of controller modes 326 may be selected during a segment of segments 346. In some illustrative examples, different controller modes of plurality of controller modes 326 may be selected during a segment of segments 346.

Plurality of controller modes 326 include first mode 354, second mode 356, third mode 358, fourth mode 360, and fifth mode 362. First mode 354 of controller modes 326 may control heating equipment 304 based on a highest temperature value and a lowest temperature value at a single time from temperature values 323. In one illustrative example, first mode 354 may be used by cure controller 308 when the highest temperature value is below hot threshold 336 and when the lowest temperature value is above cold threshold 338.

Of temperature values 323, first mode 354 of controller modes 326 uses a highest temperature value and a lowest temperature value at this first time. A difference between the highest temperature value and hot threshold 336 is determined. A difference between the lowest temperature value and cold threshold 338 is determined. First mode 354 of controller modes 326 controls heating equipment 304 in order to equalize these differences. In other words, first mode 354 is configured to change a heater setting to cause a difference between a highest temperature value and hot threshold 336 and a difference between a lowest temperature value and cold threshold 338 to be substantially a same value, in response to a determination that no temperature value of the temperature values from the single reading exceeds cold threshold 338 or hot threshold 336. As used herein, a temperature value exceeds hot threshold 336 when the temperature value is above hot threshold 336. As used herein, a temperature value exceeds cold threshold 338 when the temperature value is below cold threshold 338.

In some illustrative examples, first mode 354 adjusts a cure setting based on hot threshold 336 and cold threshold 338. In some illustrative examples, first mode 354 adjusts a cure setting based on offsets of offsets 342 associated with hot threshold 336 and cold threshold 338.

Cure controller 308 may control heating equipment 304 by changing heater setting 366. When initiating cure profile 344, heater setting 366 may be configured based on temperature profile 368 of cure profile 344. In some illustrative examples, cure controller 308 may change heater setting 366 up or down from the configuration based on the temperature profile 368 to increase or decrease the heat to curable material 316 using first mode 354.

In one illustrative example, the difference between a highest temperature value and hot threshold 336 is 5 degrees Fahrenheit at a first time. In this illustrative example, the difference between the lowest temperature value and cold threshold 338 is 10 degrees Fahrenheit at the first time. In order to equalize the differences, the difference between the highest temperature value and hot threshold 336 should increase and the difference between the lowest temperature value and cold threshold 338 should decrease. In this illustrative example, cure controller 308 using first mode 354 may control heating equipment 304 to reduce heat to curable material 316. To reduce heat to curable material 316, cure controller 308 may reduce heater setting 366. As a result, a highest temperature value at a second time will be lower, causing the difference between the highest temperature value and hot threshold 336 to increase and causing the difference between the lowest temperature value and cold threshold 338 to decrease.

Second mode 356 of plurality of controller modes 326 may control heating equipment 304 based on a lowest temperature value at a single time from temperature values 323. In some illustrative examples, cure controller 308 may increase heater setting 366 to increase the heat provided by heating equipment 304 to curable material 316 using second mode 356. In one illustrative example, second mode 356 may be used by cure controller 308 when the lowest temperature value is near or below cold threshold 338.

Second mode 356 of plurality of controller modes 326 may control heating equipment 304 such that a lowest temperature value is prevented from falling below or is raised above cold threshold 338. In some illustrative examples, second mode 356 may be selected when the distance between a highest temperature value and a lowest temperature value is greater than a distance between hot threshold 336 and cold threshold 338. In these illustrative examples, second mode 356 may allow a highest temperature value to exceed hot threshold 336 to prevent lowest temperature value from falling below cold threshold 338 or to raise the lowest temperature value above cold threshold 338. In some illustrative examples, second mode 356 adjusts a cure setting based on cold threshold 338. In some illustrative examples, second mode 356 adjusts a cure setting based on offsets in offsets 342 associated with cold threshold 338. In some illustrative examples, second mode 356, responsive to a determination that at least one temperature value of temperature values 323 from a single reading is near cold threshold 338, increases heater setting 366 despite future temperature values exceeding hot threshold 336.

In some illustrative examples, temperature values lower than cold threshold 338 are less desirable than temperature values higher than hot threshold 336. In these illustrative examples, maintaining temperature values above cold threshold 338 may be prioritized over maintaining temperature values lower than hot threshold 336. As a result, second mode 356 may be prioritized over other controller modes of plurality of controller modes 326.

This prioritization may be a result of curable material properties 328. Specifically, curable material properties 328 of curable material 316 may have more desirable qualities when cured at higher temperatures than at lower temperatures. For example, reducing cure temperature may cause curable material 316 to have reduced bond strength with structure 312. Increasing cure temperature may cause curable material 316 to have a higher porosity or a greater brittleness, but increased bond strength. In one embodiment, the priority of maintaining temperature values below a hot threshold may change based on the particular segment being executed.

Third mode 358 of plurality of controller modes 326 may control heating equipment 304 such that a lowest temperature value does not fall below cold alarm 340. In some illustrative examples, cure controller 308 may increase heater setting 366 to increase the heat to curable material 316 using third mode 358. In some illustrative examples in which cure parameters 324 includes optional second hot threshold 337, other modes may allow a highest temperature value to exceed hot threshold 336 but prevent the highest temperature value from exceeding optional second hot threshold 337. In these illustrative examples, third mode 358 may allow the highest temperature value to exceed optional second hot threshold 337 if the lowest temperature value is near or falls below cold alarm 340. In some illustrative examples, third mode 358 adjusts a cure setting based on cold alarm 340. In some illustrative examples, third mode 358 adjusts a cure setting based on offsets in offsets 342 associated with cold alarm 340.

Fourth mode 360 of plurality of controller modes 326 may control heating equipment 304 based on a highest temperature value at a single time from temperature values 323. In some illustrative examples, cure controller 308 may decrease heater setting 366 to decrease the heat to curable material 316 using fourth mode 360. In one illustrative example, fourth mode 360 may be used by cure controller 308 when the highest temperature value is near hot threshold 336. In some illustrative examples, fourth mode 360 adjusts a cure setting based on hot threshold 336. In some illustrative examples, fourth mode 360 adjusts a cure setting based on offsets in offsets 342 associated with hot threshold 336.

Fourth mode 360 of plurality of controller modes 326 may control heating equipment 304 such that a highest temperature value is prevented from rising above hot threshold 336. In some illustrative examples, fourth mode 360 may not be selected if second mode 356 may be selected. In some illustrative examples, fourth mode 360 may be selected when a distance between a highest temperature value and a lowest temperature value is less than the distance between hot threshold 336 and cold threshold 338.

In some illustrative examples, temperature values higher than hot threshold 336 may be less desirable than temperature values below cold threshold 338. In these illustrative examples, maintaining temperature values below hot threshold 336 may be prioritized over maintaining temperature values higher than cold threshold 338. As a result, fourth mode 360 may be prioritized over other controller modes of plurality of controller modes 326.

This prioritization may be a result of curable material properties 328. Specifically, curable material properties 328 of curable material 316 may have more desirable qualities when cured at lower temperatures than at higher temperatures. For example, when initially heating curable material 316, curable material 316 may contain moisture. Higher temperatures during initial heating may cause undesirable porosity in curable material 316. Higher temperatures during initial heating may cause undesirable runaway heating in curable material 316. In one embodiment, the priority of maintaining temperatures below a hot threshold may change based on the particular segment being executed. In one embodiment, maintaining temperature values below the hot threshold during initial segments may be desirable. In later segments, it may be desirable to maintain the temperatures above the cold temperature threshold to ensure all material achieves the desired degree of cure.

Fifth mode 362 of plurality of controller modes 326 may control heating equipment 304 based on a highest temperature value at a single time from temperature values 323. In some illustrative examples, cure controller 308 may decrease heater setting 366 to decrease the heat to curable material 316 using fifth mode 362. In one illustrative example, fifth mode 362 may be used by cure controller 308 when the highest temperature value is near hot alarm 334. In some illustrative examples, fifth mode 362 adjusts a cure setting based on hot alarm 334. In some illustrative examples, fifth mode 362 adjusts a cure setting based on offsets in offsets 342 associated with hot alarm 334.

Fifth mode 362 of plurality of controller modes 326 may control heating equipment 304 such that a highest temperature value is prevented from rising above hot alarm 334. In some illustrative examples, the distance between the highest temperature value and a lowest temperature value is greater than the distance between hot alarm 334 and cold threshold 338. In these illustrative examples, fifth mode 362 may allow the lowest temperature value to fall below at least one of cold threshold 338 or cold alarm 340 to prevent the highest temperature value from rising above hot alarm 334.

In some illustrative examples, although more than one controller mode in plurality of controller modes 326 may be eligible to be selected, only one controller mode may be executed. In these illustrative examples, selection order of plurality of controller modes 326 may be prioritized. In one illustrative example, a lowest temperature value may be below cold threshold 338 while a highest temperature value is near hot alarm 334. As a result, first mode 354, fourth mode 360, or fifth mode 362 might be selected. In one illustrative example, selection logic may be established such that the controller mode in plurality of controller modes first mode 354 which is selected last will be executed. In one illustrative example, first mode 354 is selected, fourth mode 360 is ignored, and then fifth mode 362 is selected. In this illustrative example, fifth mode 362 is executed as fifth mode 362 was selected last.

The illustration of manufacturing environment 300 in FIG. 3 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, cure parameters 324 may not include optional second hot threshold 337. In another illustrative example, cure parameters 324 may also include an optional second cold threshold. In some illustrative examples, cure parameters 324 may include more than two hot thresholds. In some illustrative examples, cure parameters 324 may include more than two cold thresholds. In another illustrative example, cure parameters 324 may not include offsets 342. In yet another illustrative example, at least one of temperature profile 368 or time 370 may be divided into target temperatures 374 and times 376 within segments 346.

Figure 4:
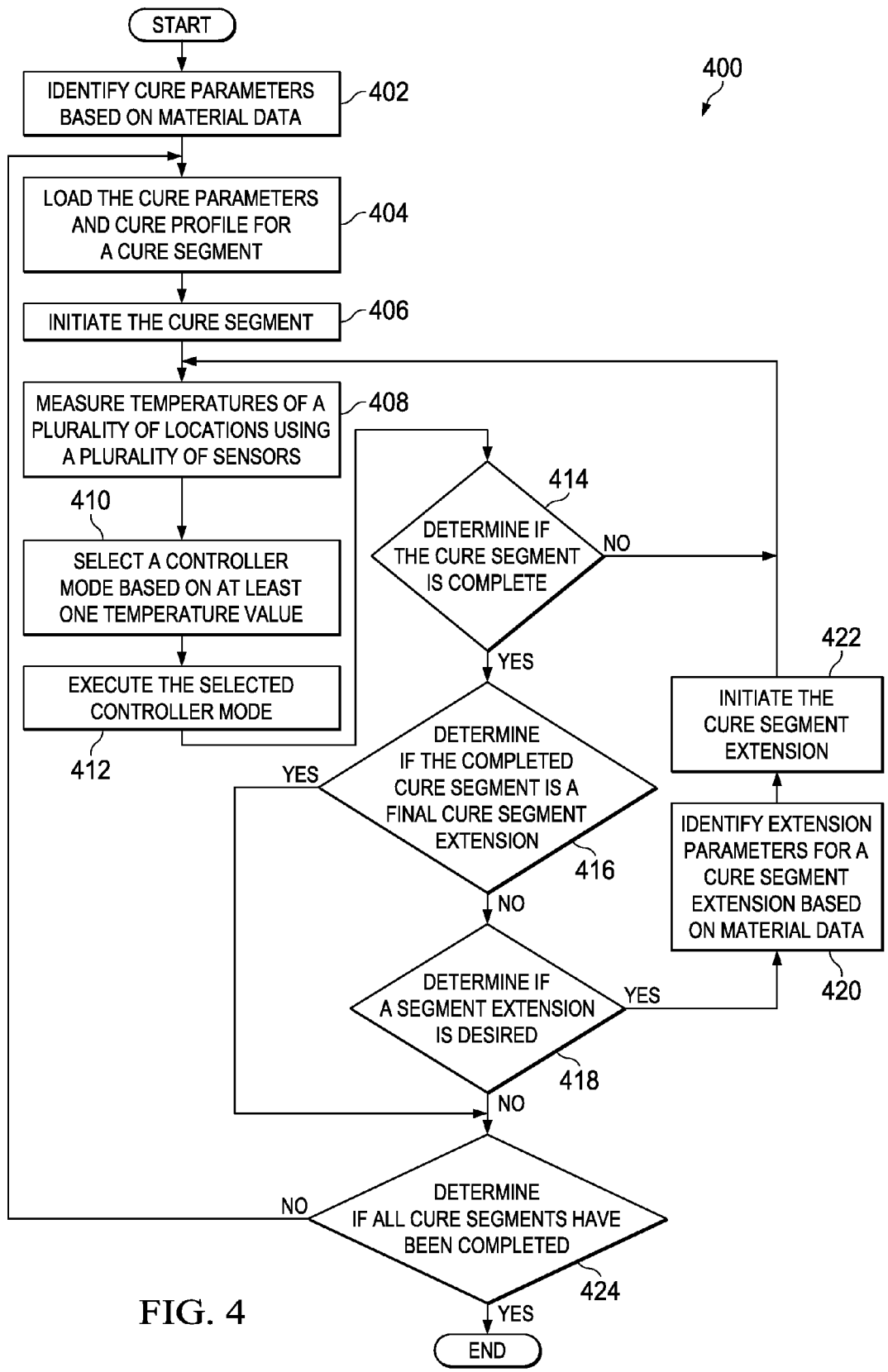
FIG. 4 is an illustration of a flowchart of a process for controlling a cure of a curable material in accordance with an illustrative embodiment.

Turning now to FIG. 4, an illustration of a flowchart of a process for controlling a cure of a curable material is depicted in accordance with an illustrative embodiment. In this illustrative example, process 400 in FIG. 4 may be implemented in manufacturing environment 300 in FIG. 3.

The process begins by identifying cure parameters based on material data (operation 402). Material data may include data related to the cure of curable material. In some illustrative examples, the material data may include cure kinetic curves for the curable material. Cure parameters may comprise at least one of a hot alarm, a hot threshold, a cold threshold, a cold alarm, or other suitable cure parameters.

Next, the process loads the cure parameters and cure profile for a cure segment (operation 404). Cure parameters for a cure segment may include at least one of a hot alarm, a hot threshold, a cold threshold, a cold alarm, or other suitable cure parameters. In some illustrative examples, at least one of a hot alarm, a hot threshold, a cold threshold, or a cold alarm may maintain a same value for the length of time of the cure segment. In some illustrative examples, at least one of a hot alarm, a hot threshold, a cold threshold, or a cold alarm may increase in value over the length of time of the cure segment.

In some illustrative examples, a cure segment for a cure profile may comprise at least one of a time, target temperature, rate of increase, or other suitable cure characteristics. In one illustrative example, a cure segment comprises one of a temperature raise or a temperature hold segment.

The process then initiates the cure segment (operation 406). By initiating the cure segment, the process may control the cure process according to at least one of the cure parameters and the cure profile of the currently selected cure segment. In some illustrative examples, initiating the cure segment may include applying heat using heating equipment such as a heating blanket, an oven, an iron, an autoclave, or other suitable heating equipment. In some illustrative examples, applying heat using the heating equipment may be performed using a target temperature of the segment. In some illustrative examples, applying heat using the heating equipment may be performed using a heater setting of the cure controller.

Next the process measures temperatures of a plurality of locations using a plurality of sensors (operation 408). The plurality of sensors may be positioned relative to a corresponding plurality of locations of a curable material. As a result, the plurality of sensors will produce temperature measurements for the corresponding plurality of locations of the curable material.

The process then selects a controller mode based on at least one temperature value (operation 410). In some illustrative examples, the temperature value may be the same as a temperature measurement produced by the plurality of sensors. In some illustrative examples, the temperature value may be a value obtained using the temperature measurements and a thermal analysis model. The thermal analysis model may be for a surface temperature profile for the curable material. In some illustrative examples, a controller mode may be selected based on at least one temperature value and at least one cure parameter of the cure parameters. In one illustrative example, a controller mode is selected based on a lowest temperature value in the most recent temperature values and a cold threshold. In another illustrative example, a controller mode is selected based on a highest temperature value in the most recent temperature values and a hot threshold. In one illustrative example, a controller is selected based on a highest temperature value, a lowest temperature value, a hot threshold, and a cold threshold.

Next, the process executes the selected controller mode (operation 412). By executing the selected controller mode, the process may adjust cure settings. In one illustrative example, executing the selected controller mode comprises increasing the heat supplied by the heating equipment. In one illustrative example, executing the selected controller mode comprises decreasing the heat supplied by the heating equipment.

After executing the selected controller mode, the process determines if the cure segment is complete (operation 414). In some illustrative examples, the cure segment may be complete when the time of the cure profile for the cure segment has expired. In one illustrative example, a time associated with a cure segment is 5 minutes. If operation 414 is performed 3 minutes after the cure segment is initiated, the cure segment may not be complete.

In some illustrative examples, a cure segment may be complete when a target degree of cure for the cure segment is achieved. In one illustrative example, the target degree of cure for a cure segment is 10% and a time is 10 minutes. If the achieved degree of cure reaches 10% after 8 minutes, the cure segment may be complete.

In some illustrative examples, if the cure segment reaches the target degree of cure prior to completion of the time for the segment, the segment may end prior to the completion of the time for the segment. In these illustrative examples, the estimated time of the cure profile may be reduced accordingly.

If a cure segment is determined to not be complete at operation 414, the process will return to operation 408 and repeat operation 408 through operation 414. If a cure segment is determined to be complete, the process moves to operation 416.

In operation 416, the process determines if the completed cure segment is a final cure segment extension. Following the completion of a cure segment, a cure segment extension may be executed. A limit may be placed on the number of cure segment extensions which may be executed after a particular cure segment. In one illustrative example, two cure segment extensions may be executed after a first cure segment. The second cure segment extension may be referred to as the final cure segment extension as only two cure segment extensions may be executed after the first cure segment. Operation 416 determines if the completed cure segment is the last allowed, or final cure segment extension.

If the completed cure segment is determined not to be a final cure segment extension, the process moves to operation 418. In operation 418, the process determines if a segment extension is desired (operation 418). In some illustrative examples, a segment extension is desired if at least one temperature value from the cure segment exceeds a cold threshold. As used herein, a temperature value exceeds a cold threshold if the temperature value drops below the cold threshold. In some illustrative examples, a segment extension is desired if the segment has not met a target degree of cure. If the process determines a segment extension is desired, the process moves to operation 420. In operation 420, the process identifies extension parameters for a cure segment extension based on material data. Extension parameters may include at least one of time, target temperature, degree of cure, and other suitable parameters. In some illustrative examples, extension parameters may be identified from a cure kinetic curve for the curable material. In some illustrative examples, extension parameters may be identified to bring a lowest temperature value above the cold threshold. In some illustrative examples, extension parameters may be identified to allow the segment and segment extension when combined to meet the respective target degree of cure.

Next, the process initiates the cure segment extension (operation 422). A cure segment extension adds time to the cure, thus changing the cure settings. In some illustrative examples, a cure segment extension may also change the heater setting thus changing the cure settings. The process then repeats operation 408 through operation 416 for the cure segment extension.

After operation 416, if the completed cure segment is determined to be a final cure segment extension, the process moves to operation 424. In operation 424, the process determines if all cure segments have been completed. If the process determines not all cure segments have been completed, the process returns to operation 404 and loads the cure parameters and cure profile for the next cure segment. If the process determines all cure segments have been completed, the process terminates.

Figure 5A:
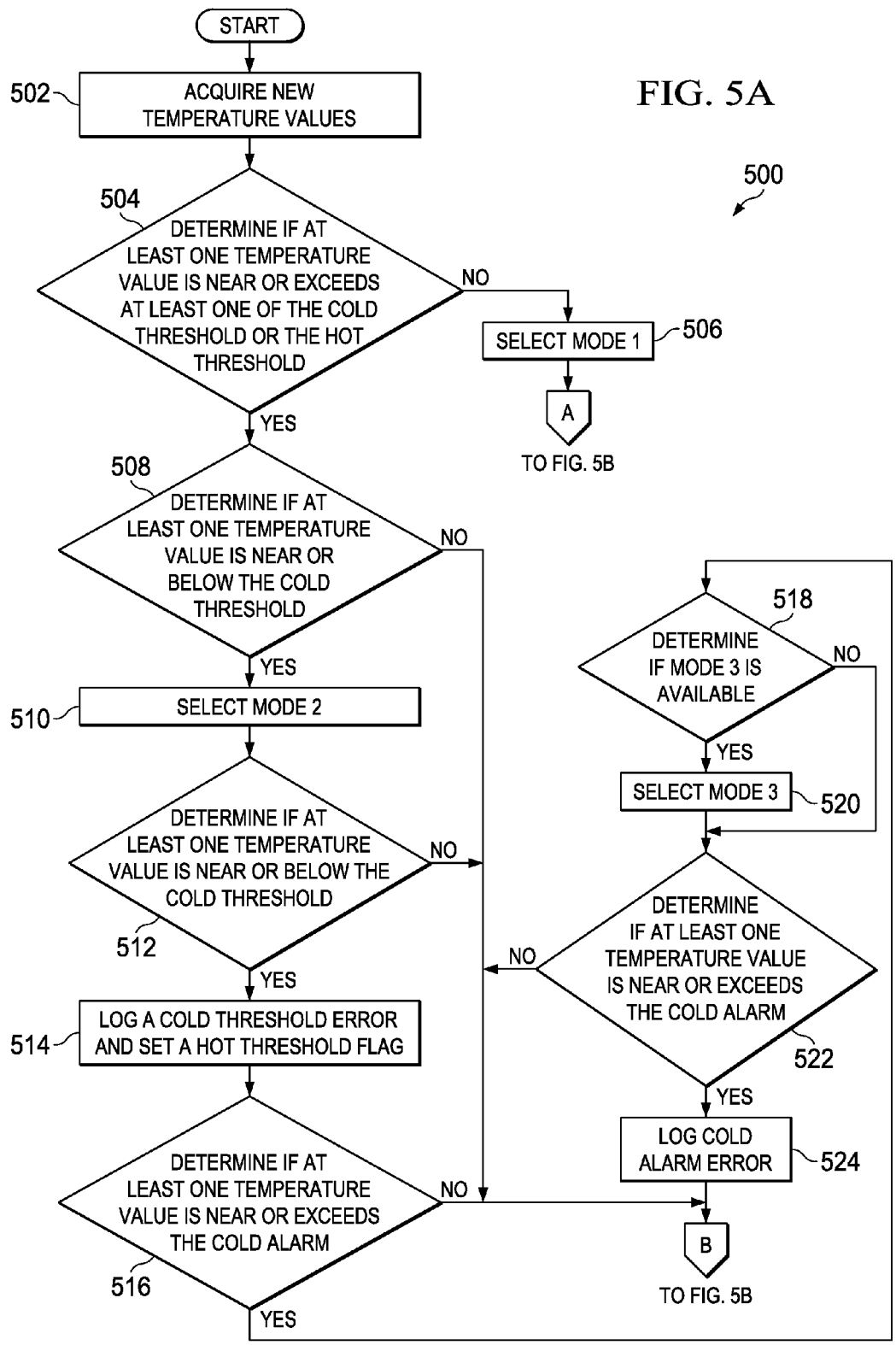
FIGS. 5A and 5B are an illustration of a flowchart of a process for selecting a controller mode during a cure of a curable material in accordance with an illustrative embodiment.
Figure 5B:
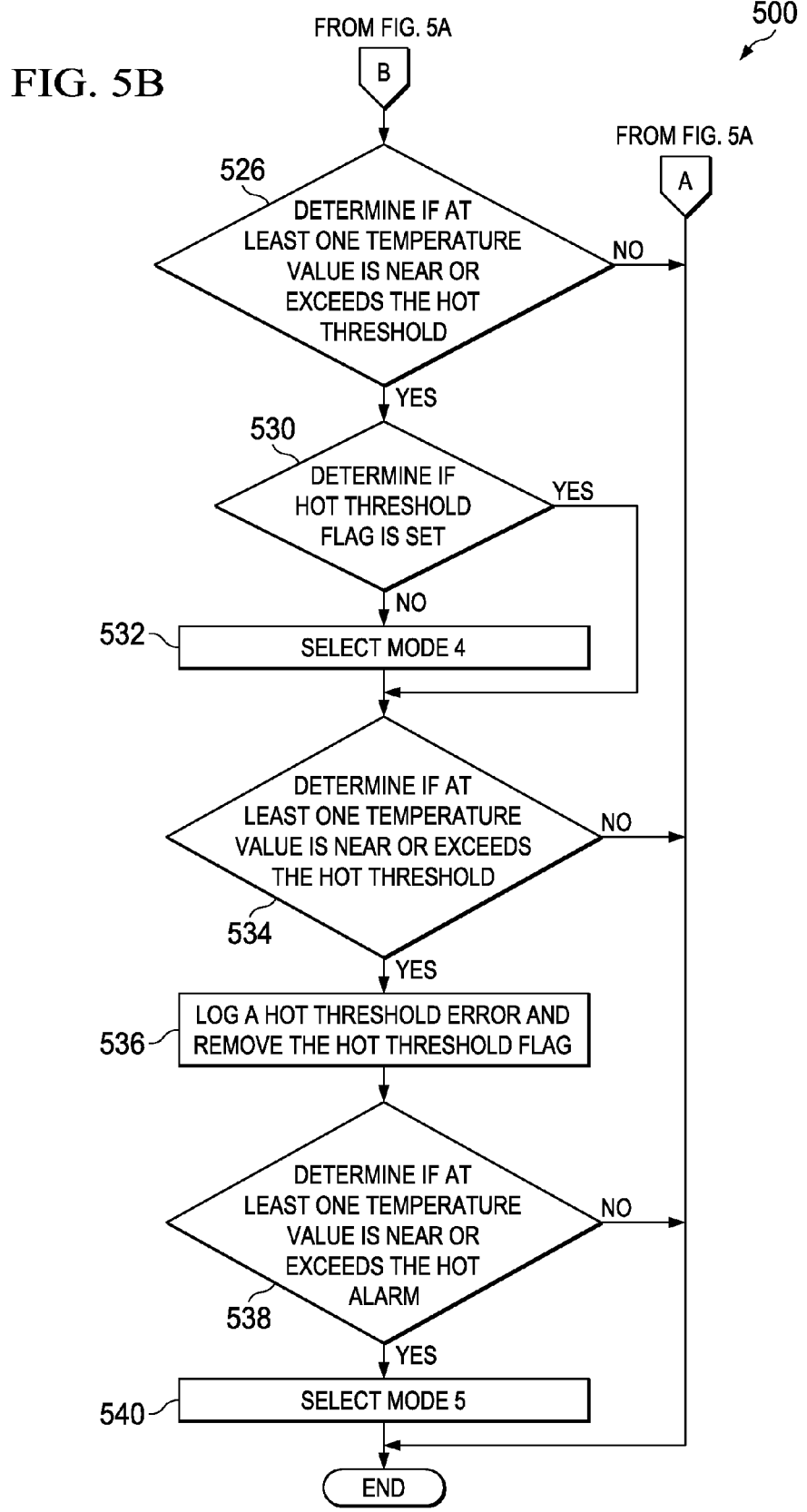

Turning now to FIGS. 5A and 5B, illustrations of a flowchart of a process for selecting a controller mode during a cure of a curable material is depicted in accordance with an illustrative embodiment. In this illustrative example, process 500 in FIGS. 5A and 5B may be implemented in manufacturing environment 300 in FIG. 3. In some illustrative examples, process 500 may be implemented as a process for selecting a controller mode in operation 410 of FIG. 4. In some illustrative examples, the process of FIGS. 5A and 5B may be executed for each set of temperature measurements taken by the plurality of sensors.

The process begins by acquiring new temperature values (operation 502). The new temperature values may be obtained using new temperature measurements received from a plurality of sensors.

Next, the process determines if at least one temperature value is near or exceeds at least one of the cold threshold or the hot threshold (operation 504). In some illustrative examples, a temperature value may be near a threshold if the temperature value is within a pre-determined distance from the threshold but has not exceeded the threshold. In some illustrative examples, pre-determined distances may be identified as offsets such as offsets 342 of FIG. 3.

If the process does not determine at least one temperature value to be near or exceed either the hot threshold or the cold threshold, the process proceeds to operation 506. In operation 506, the process selects mode 1. Following operation 506, the process ends.

In this illustrative example, mode 1 may be configured to maintain future temperature values within the cold threshold and the hot threshold. In some illustrative examples, mode 1 may be configured to control heating equipment such that the difference between a highest temperature value and the hot threshold and the difference between a lowest temperature value and the cold threshold move towards being substantially the same.

If the process determines that at least one temperature value is near or exceeds at least one of the cold threshold or the hot threshold, the process proceeds to operation 508. In operation 508, the process determines if at least one temperature value is near or below the cold threshold. If the process does not determine at least one temperature value to be near or below the cold threshold, the process proceeds to operation 526. Operation 526 will be explained in detail below.

If the process determines at least one temperature value is near or exceeds the cold threshold, the process continues to operation 510. In operation 510, the process selects mode 2. In one illustrative example, mode 2 may be a controller mode which controls heating equipment based on a lowest temperature value. In this illustrative example, mode 2 may be configured to prevent temperature values from falling below the cold threshold. In some illustrative examples, mode 2 may be configured to allow temperature values to exceed the hot threshold in order to prevent temperature values from falling below the cold threshold. For this reason, mode 2 may be said to prioritize the cold threshold.

After selecting mode 2, the process determines if at least one temperature value is near or below the cold threshold (operation 512). If the process does not determine at least one temperature value to be near or below the cold threshold, the process proceeds to operation 526.

If the process determines at least one temperature value is below the cold threshold, the process logs a cold threshold error and sets a hot threshold flag (operation 514). In some illustrative examples, a cold threshold error may be used in a process, such as process 400 to determine whether a cure segment extension will be executed. In some illustrative examples, a cold threshold error may be used to determine a resulting quality of a curable material after cure.

A hot threshold flag may be used to prioritize at least one of mode 2 or mode 3 over mode 4. A hot threshold flag may be used in some illustrative examples in which properties of a curable material are more adversely affected by lower temperatures than higher temperatures. In these illustrative examples, process 500 may prioritize maintaining temperature values above a cold threshold than maintaining temperature values below a hot threshold.

Following operation 514, the process determines if at least one temperature value is near or exceeds the cold alarm (operation 516). If the process does not determine at least one temperature value is near or exceeds the cold alarm, the process proceeds to operation 526.

If the process determines at least one of the temperature values is near or exceeds the cold alarm, the process proceeds to operation 518. At operation 518, the process determines if mode 3 is available. In some illustrative examples, mode 3 may only be available when two hot thresholds are available. In some illustrative examples, mode 3 may always be available.

If the process determines mode 3 is available, the process selects mode 3 (operation 520). In some illustrative examples, mode 3 may be configured to prevent temperature values from falling below the cold alarm. In some illustrative examples, mode 3 may be configured to allow at least one temperature value to exceed a second hot threshold to prevent at least one temperature value from falling near or below the cold alarm.

After selecting mode 3, the process proceeds to operation 522. If the process determines mode 3 is not available, the process proceeds to operation 522.

In operation 522, the process determines if at least one temperature value is near or exceeds the cold alarm. If the process does not determine at least one temperature value to be near or exceeds the cold alarm, the process proceeds to operation 526. If the process determines at least one temperature value does exceed the cold alarm, the process logs a cold alarm error (operation 524). Following operation 524, the process continues to operation 526.

In operation 526, the process determines if at least one temperature value is near or exceeds the hot threshold. If the process does not determine at least one temperature value is near or exceeds the hot threshold, the process ends. If the process determines at least one temperature value is near or exceeds the hot threshold, the process continues to operation 530. In operation 530, the process determines if a hot threshold flag is set.

If the process does not determine a hot threshold flag is set, the process selects mode 4 (operation 532). If the process determines a hot threshold flag is set, the process continues to operation 534. In operation 534, the process determines if at least one temperature value is near or exceeds the hot threshold. If the process does not determine at least one temperature value is near or exceeds the hot threshold, the process ends. If the process determines at least one temperature value is above the hot threshold, the process logs a hot threshold error and removes the hot threshold flag (operation 536).

The process next determines if at least one temperature value is near or exceeds the hot alarm (operation 538). If the process does not determine at least one temperature value is near or exceeds the hot alarm, the process ends. If the process determines at least one temperature value is near or exceeding the hot alarm, the process selects mode 5 (operation 540). Afterwards, the process ends.

As depicted, mode 5 has priority over both mode 3 and mode 2. In other words, even if a hot threshold flag is set, mode 5 may still be selected. As depicted, mode 5 has the highest priority of all possible modes. In some illustrative examples, mode 5 may prevent temperature values from exceeding the hot alarm. In these illustrative examples, the hot alarm may be chosen based on at least one of quality concerns or safety standards. In some illustrative examples, temperatures above the hot alarm may damage associated structures or present risks to human operators. As a result, in these illustrative examples, mode 5 may have the highest priority of all possible modes.

Figure 6:
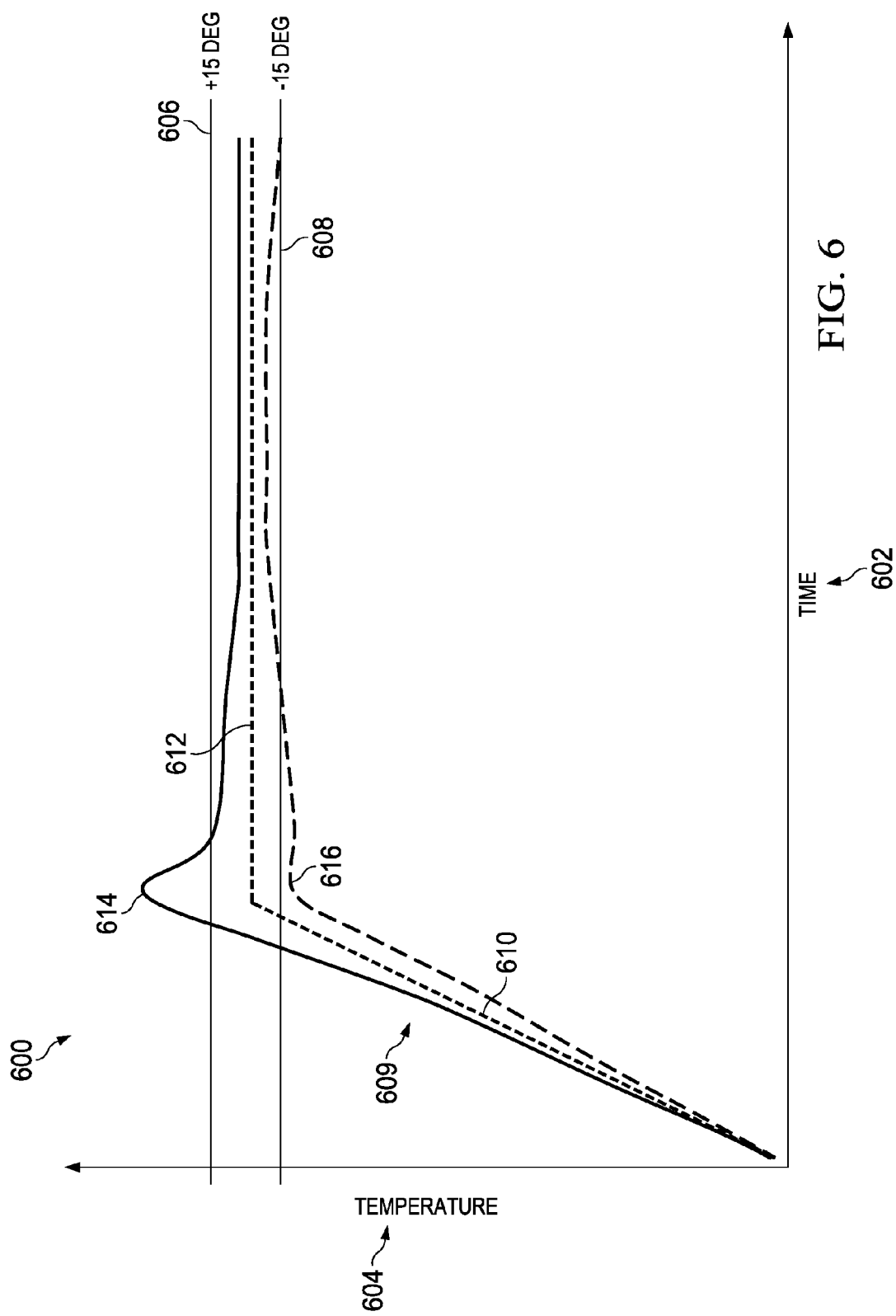
FIG. 6 is an illustration of a cure cycle using a traditional controller in accordance with an illustrative embodiment.

Turning now to FIG. 6, an illustration of a cure cycle using a traditional controller is depicted in accordance with an illustrative embodiment. As depicted, cure cycle 600 has x-axis 602 and y-axis 604. X-axis 602 depicts time of the cure while y-axis 604 depicts temperature of the cure.

A traditional controller may use the temperature measurements to drive the cure of a curable material to the temperature profile. A traditional controller may use a single temperature measurement or an average of multiple temperature measurements in driving the cure of the curable material to the temperature profile.

However, only using a traditional controller may not be desirable. Control tuning parameters for a traditional controller may be set based on anticipated thermal properties of a structure. However, in some illustrative examples, the thermal properties of a structure may not be known. Further, in some illustrative examples, the known thermal properties may not represent all thermal complexities. Further, in some illustrative examples, the thermal properties of a structure may not be the same for all portions of a structure. As a result, using only a traditional controller may not be desirable for executing a cure.

Additionally, at least one of the structural geometry and thermal characteristics of the structure may not allow for uniform heating of a curable material over an area of the structure. As a result, even if parameter settings for the PID controller are correct, the temperatures in a curable material may not be uniform. Thus, a traditional controller may not be able to provide a curable material with desirable properties.

Cure cycle 600 has cure profile 609, offset 608, and offset 606. Cure profile 609 comprises temperature profiles and times for cure cycle 600. Cure profile 609 has ramp section 610 and hold section 612. In ramp section 610, a temperature profile of cure cycle 600 increases linearly. In hold section 612, a temperature profile is held steady for a length of time to cure the curable material.

By executing a cure using cure profile 609, different portions of a curable material are heated to different temperatures. Highest temperature value 614 raises above the temperature profile of cure profile 609 during ramp section 610. As depicted, the rate of temperature increase for highest temperature value 614 is larger than the rate of temperature increase of lowest temperature value 616. Further, the rate of temperature increase for highest temperature value 614 is larger than the target rate of temperature increase in ramp section 610. As a result, highest temperature value 614 breaches offset 606 while lowest temperature value 616 is below offset 608. As cure cycle 600 continues, highest temperature value 614 and lowest temperature value 616 eventually converge near the temperature profile of hold section 612. However, after cure cycle 600 completes, a user must analyze cure cycle 600 to determine whether cure cycle 600 produces a curable material with desirable properties.

As depicted, offset 606 and offset 608 may be designated by a user. Further, offset 606 and offset 608 may only be applicable to hold section 612. Further, in a traditional cure cycle, users may unnecessarily scrap curable materials falling outside of offset 606 and offset 608. In a traditional cure cycle, user knowledge and input is used to handle exceptional conditions.

Figure 7:
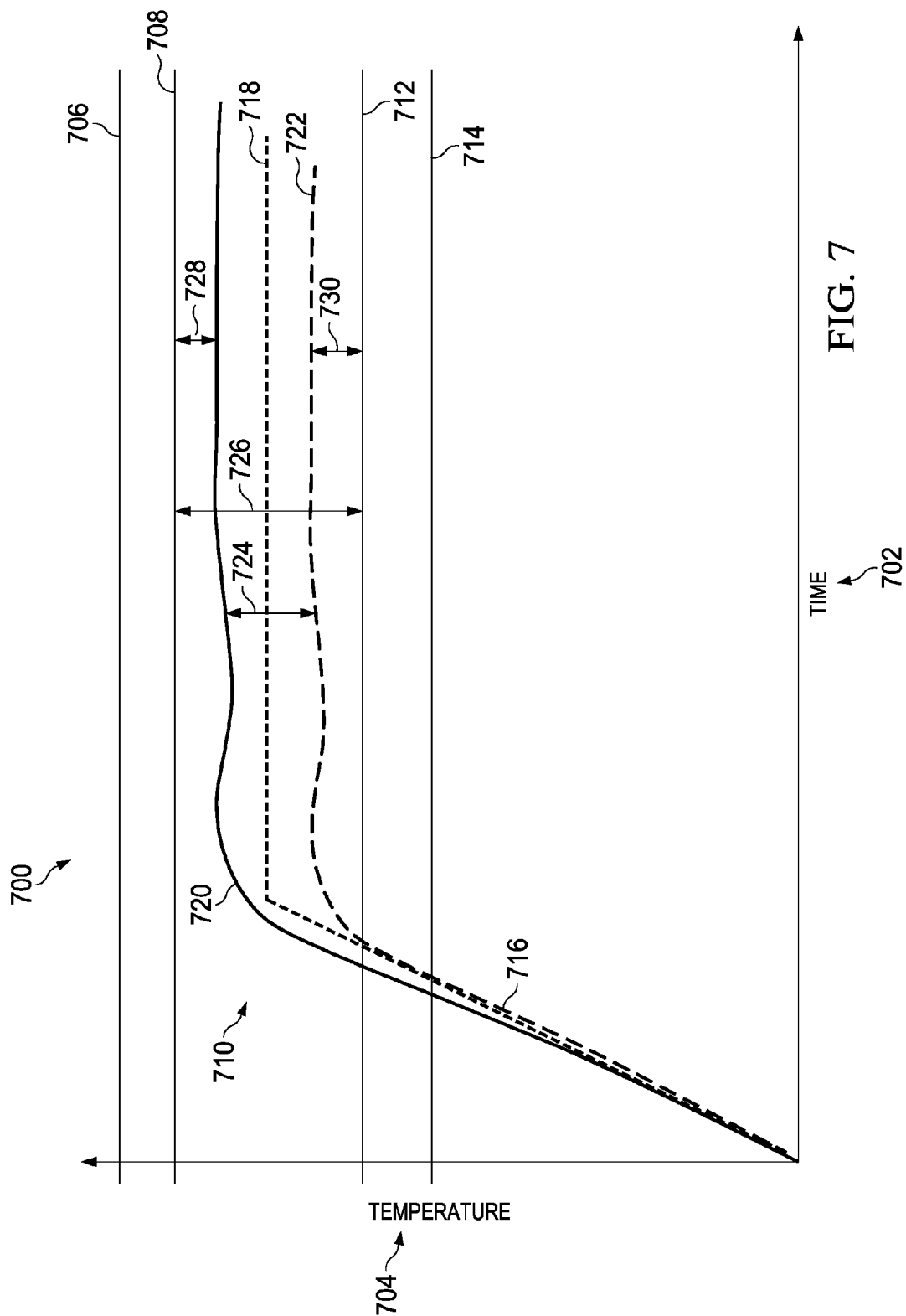
FIG. 7 is an illustration of a cure cycle using a first controller mode in accordance with an illustrative embodiment.

Turning now to FIG. 7, an illustration of a cure cycle using a first controller mode is depicted in accordance with an illustrative embodiment. Cure cycle 700 of FIG. 7 may be performed in manufacturing environment 300 of FIG. 3.

Cure cycle 700 has x-axis 702 and y-axis 704. X-axis 702 depicts time of the cure while y-axis 704 depicts temperature of the cure.

Cure cycle 700 has hot alarm 706, hot threshold 708, cure profile 710, cold threshold 712, and cold alarm 714. Cure profile 710 comprises temperature profile and times for cure cycle 700. Cure profile 710 has ramp section 716 and hold section 718.

By executing a cure using cure profile 710, different portions of a curable material are heated to different temperatures. Highest temperature value 720 rises above the temperature profile of cure profile 710 during ramp section 716. Lowest temperature value 722 is almost the same temperature as the temperature profile for a large portion of ramp section 716. After lowest temperature value 722 reaches cold threshold 712, the rate of temperature increase for lowest temperature value 722 decreases. Likewise, the rate of temperature increase for highest temperature value 720 decreases.

Distance 724 between highest temperature value 720 and lowest temperature value 722 remains substantially the same throughout hold section 718. Distance 724 is smaller than distance 726 between hot threshold 708 and cold threshold 712. As distance 724 is smaller than distance 726, and distance 724 is consistent, highest temperature value 720 and lowest temperature value 722 may be centered within hot threshold 708 and cold threshold 712. In this illustrative example, controller mode 1 is configured to manage heating equipment so that the distance between hot threshold 708 and highest temperature value 720 and the distance between cold threshold 712 and lowest temperature value 722 are substantially the same. In one illustrative example, controller mode 1 changes a heater setting based on the difference between the distance between hot threshold 708 and highest temperature value 720 and the distance between cold threshold 712 and lowest temperature value 722. As depicted, the controller may use controller mode 1 to change the heater setting throughout the cure such that distance 728 and distance 730 are nearly identical.

In traditional cure controller systems, the cure may be directed using the temperature profile. In contrast, in this illustrative example, a controller uses hot threshold 708 and cold threshold 712 to control the cure rather than the temperature profile. As a result, in this illustrative example, the heater setting used by the controller may be different than one based on the temperature profile of cure profile 710.

Figure 8:
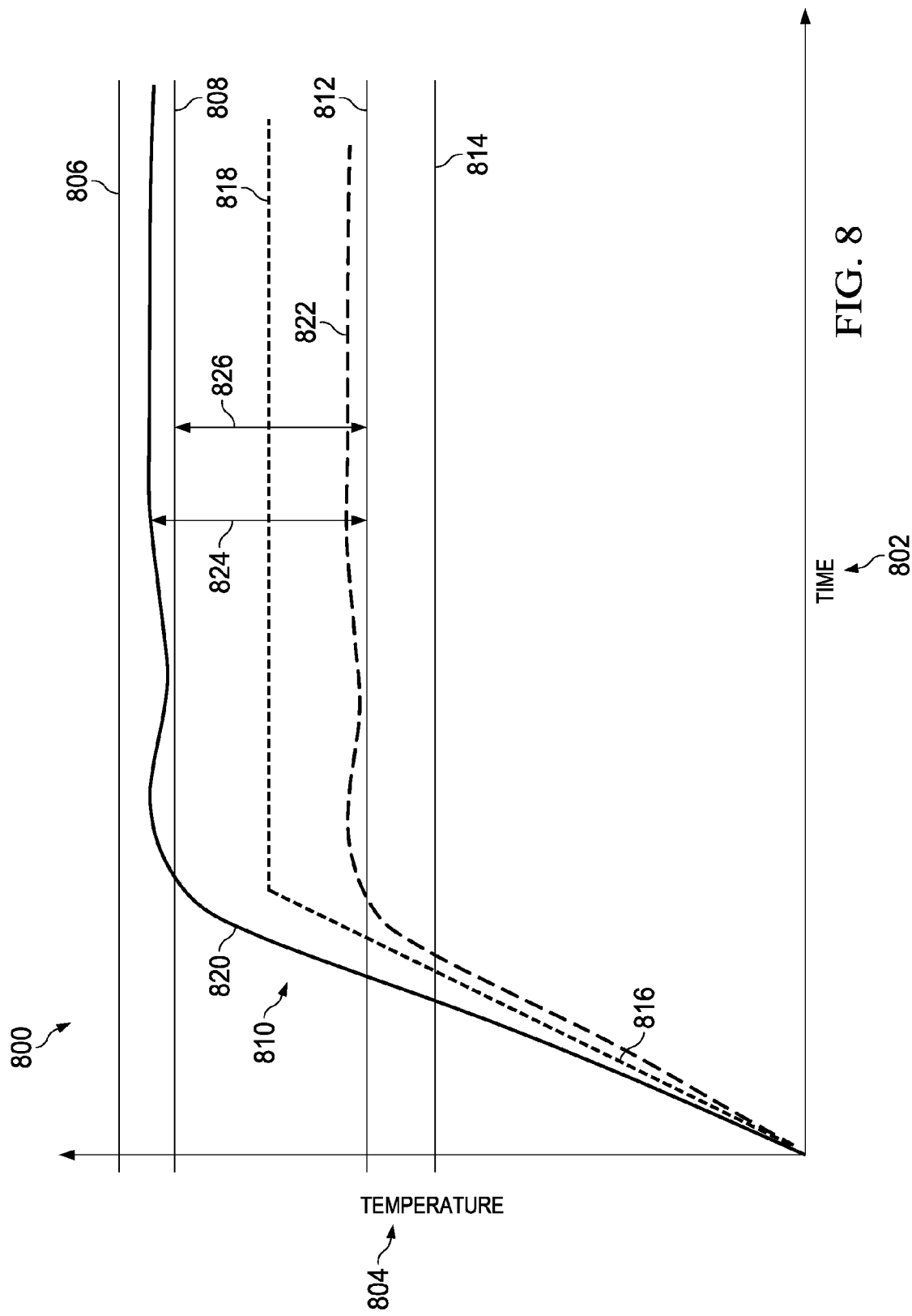
FIG. 8 is an illustration of a cure cycle using a second controller mode in accordance with an illustrative embodiment.

Turning now to FIG. 8, an illustration of a cure cycle using a second controller mode is depicted in accordance with an illustrative embodiment. Cure cycle 800 of FIG. 8 may be performed in manufacturing environment 300 of FIG. 3.

Cure cycle 800 has x-axis 802 and y-axis 804. X-axis 802 depicts time of the cure while y-axis 804 depicts temperature of the cure.

Cure cycle 800 has hot alarm 806, hot threshold 808, cure profile 810, cold threshold 812, and cold alarm 814. Cure profile 810 comprises temperature profile and times for cure cycle 800. Cure profile 810 has ramp section 816 and hold section 818.

By executing a cure using cure profile 810, different portions of a curable material are heated to different temperatures. As depicted, the rate of temperature increase for highest temperature value 820 is larger than the rate of temperature increase of lowest temperature value 822. Further, the rate of temperature increase for highest temperature value 820 is larger than the target rate of temperature increase in ramp section 816. As depicted, highest temperature value 820 breaches hot threshold 808 shortly into hold section 818. Distance 824 between highest temperature value 820 and lowest temperature value 822 remains substantially the same throughout hold section 818. Further, as depicted, distance 824 between highest temperature value 820 and lowest temperature value 822 is greater than distance 826 between hot threshold 808 and cold threshold 812. In this illustrative example, controller mode 2 is configured to maintain all temperature values above cold threshold 812. Controller mode 2 may maintain all temperature values above cold threshold 812 by changing a heater setting. Specifically, controller mode 2 is configured to manage heating equipment so that lowest temperature value 822 does not drop below cold threshold 812. In this illustrative example, controller mode 2 is configured to allow highest temperature value 820 to breach hot threshold 808. In some illustrative examples, controller mode 2 is further configured to raise any temperature values currently below cold threshold 812 to a value above cold threshold 812.

In traditional cure controller systems, the cure may be directed using the temperature profile. In contrast, in this illustrative example, a controller uses cold threshold 812 to control the cure rather than the temperature profile. As a result, in this illustrative example, the heater setting used by the controller may be different than one based the temperature profile of cure profile 810.

Figure 9:
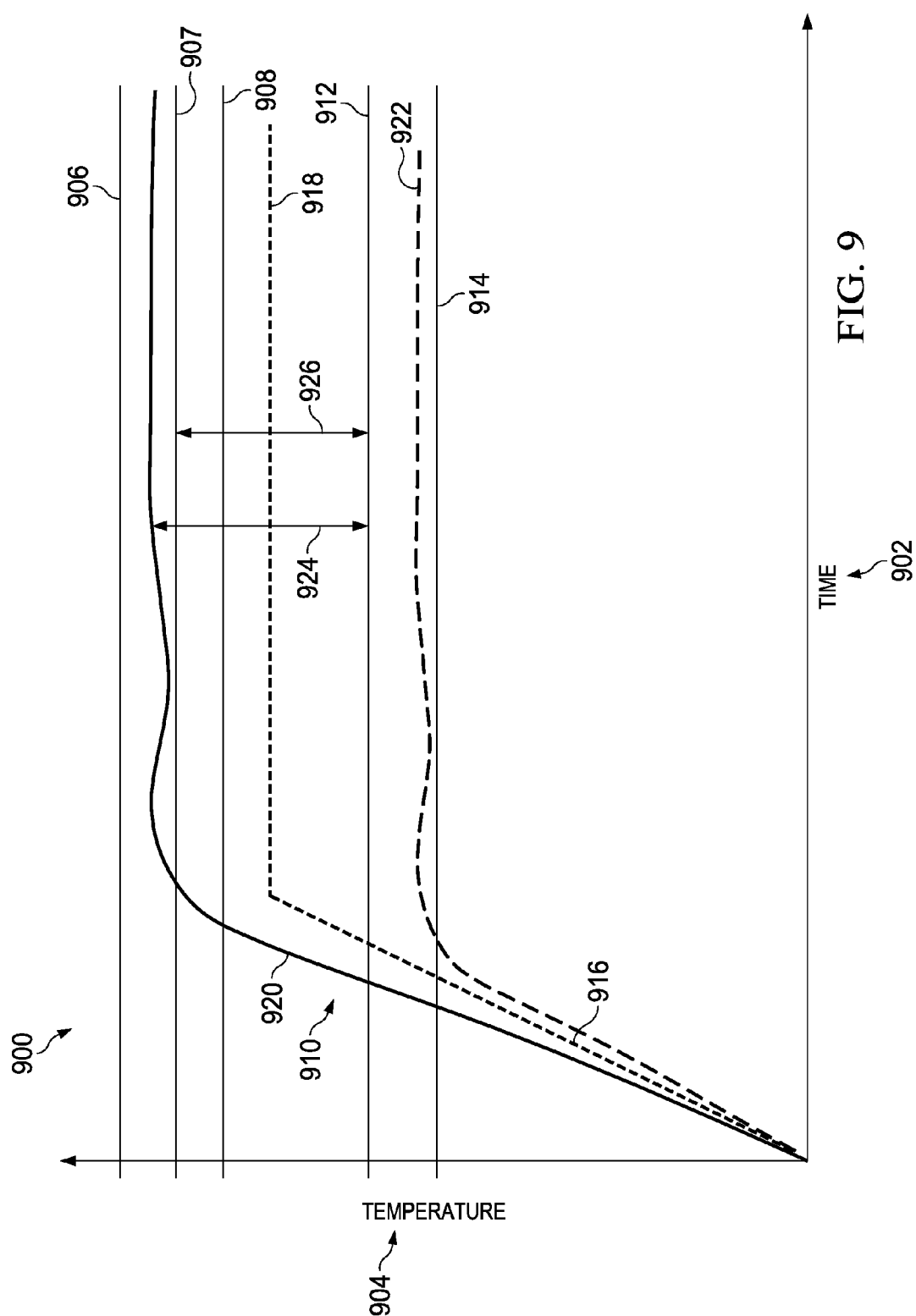
FIG. 9 is an illustration of a cure cycle using a third controller mode in accordance with an illustrative embodiment.

Turning now to FIG. 9, an illustration of a cure cycle using a third controller mode is depicted in accordance with an illustrative embodiment. Cure cycle 900 of FIG. 9 may be performed in manufacturing environment 300 of FIG. 3.

Cure cycle 900 has x-axis 902 and y-axis 904. X-axis 902 depicts time of the cure while y-axis 904 depicts temperature of the cure.

Cure cycle 900 has hot alarm 906, hot threshold 907, hot threshold 908, cure profile 910, cold threshold 912, and cold alarm 914. Cure profile 910 comprises temperature profile and times for cure cycle 900. Cure profile 910 has ramp section 916 and hold section 918.

By executing a cure using cure profile 910, different portions of a curable material are heated to different temperatures. As depicted, the rate of temperature increase for highest temperature value 920 is larger than the rate of temperature increase of lowest temperature value 922. Further, the rate of temperature increase for highest temperature value 920 is larger than the target rate of temperature increase in ramp section 916. Distance 924 between highest temperature value 920 and lowest temperature value 922 is greater than distance 926 between hot threshold 908 and cold threshold 912. In this illustrative example, controller mode 3 is configured to keep all temperature values above cold alarm 914. Specifically, controller mode 3 is configured to manage heating equipment so that lowest temperature value 922 does not drop below cold alarm 914. In this illustrative example, controller mode 3 is configured to allow highest temperature value 920 to breach hot threshold 908 to keep lowest temperature value 922 from falling below cold threshold 912. However, in some illustrative examples, distance 924 between highest temperature value 920 and lowest temperature value 922 may be larger than distance 926 between hot threshold 907 and cold threshold 912. In this illustrative example, controller mode 3 is further configured to allow highest temperature value 920 to breach hot threshold 907 to keep lowest temperature value 922 from falling below cold alarm 914. In some illustrative examples, controller mode 3 is further configured to raise any temperature values currently below cold alarm 914 to a value above cold alarm 914. In some illustrative examples, a cold alarm error may be displayed to the user operator should a temperature value be near or exceed the cold alarm.

In traditional cure controller systems, the cure may be directed using the temperature profile. In contrast, in this illustrative example, a controller uses cold alarm 914 to control the cure rather than the temperature profile. As a result, in this illustrative example, the heater setting used by the controller may be different than one based on the temperature profile of cure profile 910.

Figure 10:
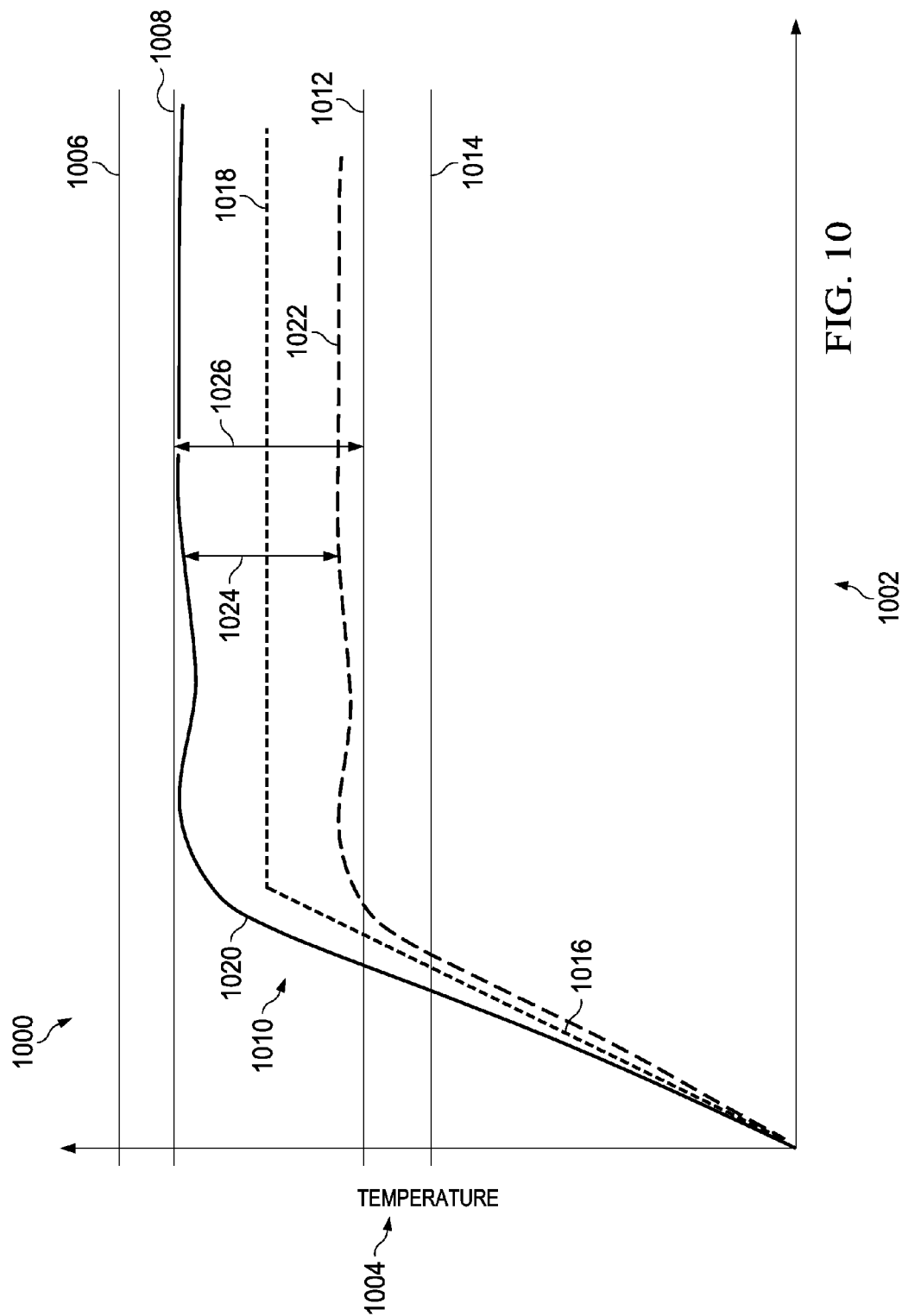
FIG. 10 is an illustration of a cure cycle using a fourth controller mode in accordance with an illustrative embodiment.

Turning now to FIG. 10, an illustration of a cure cycle using a fourth controller mode is depicted in accordance with an illustrative embodiment. Cure cycle 1000 of FIG. 10 may be performed in manufacturing environment 300 of FIG. 3.

Cure cycle 1000 has x-axis 1002 and y-axis 1004. X-axis 1002 depicts time of the cure while y-axis 1004 depicts temperature of the cure.

Cure cycle 1000 has hot alarm 1006, hot threshold 1008, cure profile 1010, cold threshold 1012, and cold alarm 1014. Cure profile 1010 comprises temperature profile and times for cure cycle 1000. Cure profile 1010 has ramp section 1016 and hold section 1018.

By executing a cure using cure profile 1010, different portions of a curable material are heated to different temperatures. As depicted, the rate of temperature increase for highest temperature value 1020 is larger than the rate of temperature increase of lowest temperature value 1022. Further, the rate of temperature increase for highest temperature value 1020 is larger than the target rate of temperature increase in ramp section 1016. Distance 1024 between highest temperature value 1020 and lowest temperature value 1022 is less than distance 1026 between hot threshold 1008 and cold threshold 1012. In this illustrative example, controller mode 4 is configured to keep all temperature values below hot threshold 1008. Specifically, controller mode 4 is configured to manage heating equipment so that highest temperature value 1020 does not rise above hot threshold 1008. In some illustrative examples, controller mode 4 is further configured to lower any temperature values currently above hot threshold 1008 to a value below hot threshold 1008.

In traditional cure controller systems, the cure may be directed using the temperature profile. In contrast, in this illustrative example, a controller uses hot threshold 1008 to control the cure rather than the temperature profile. As a result, in this illustrative example, the heater setting used by the controller may be different than one based on the temperature profile of cure profile 1010.

Figure 11:
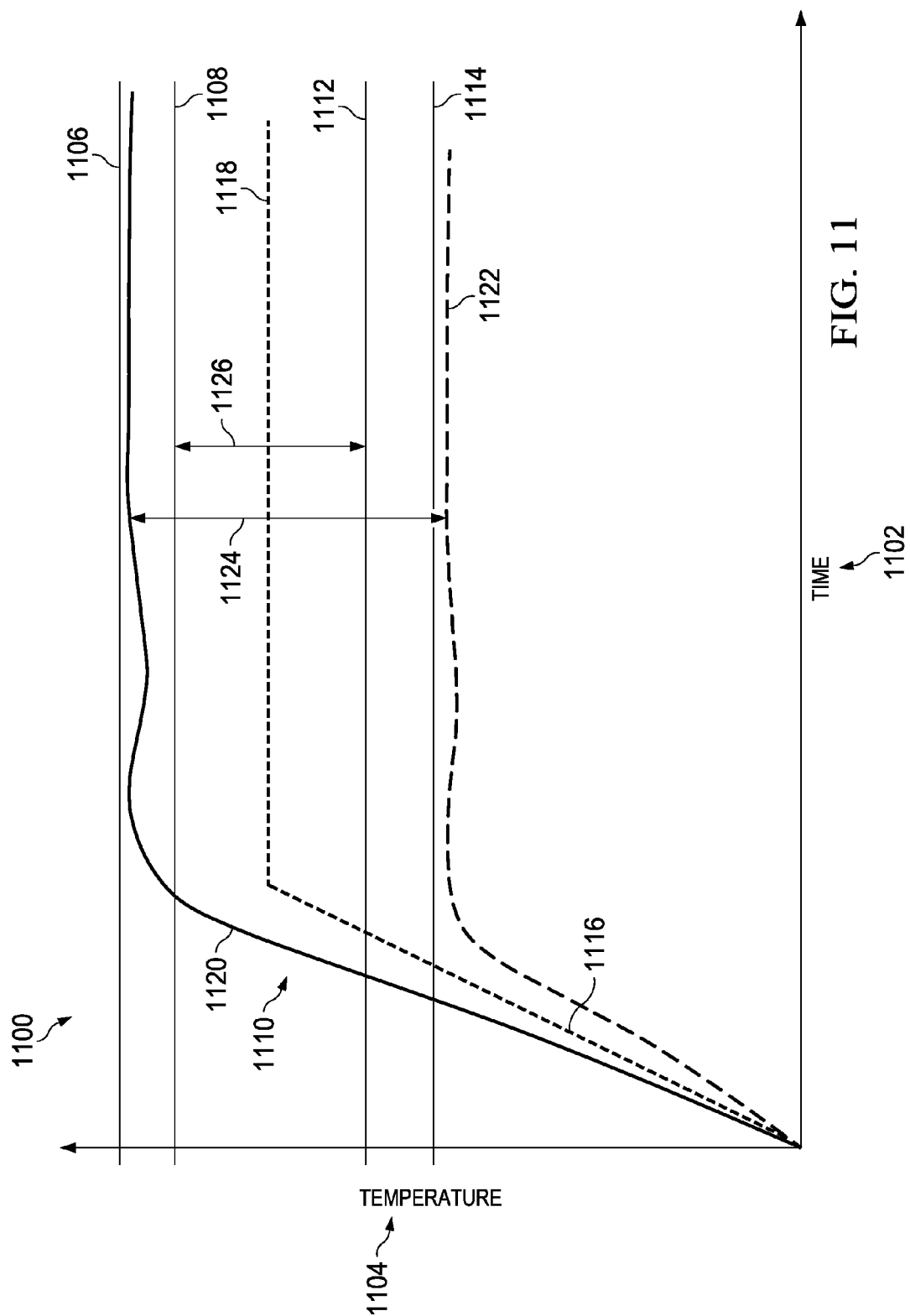
FIG. 11 is an illustration of a cure cycle using a fifth controller mode in accordance with an illustrative embodiment.

Turning now to FIG. 11, an illustration of a cure cycle using a fifth controller mode is depicted in accordance with an illustrative embodiment. Cure cycle 1100 of FIG. 11 may be performed in manufacturing environment 300 of FIG. 3.

Cure cycle 1100 has x-axis 1102 and y-axis 1104. X-axis 1102 depicts time of the cure while y-axis 1104 depicts temperature of the cure.

Cure cycle 1100 has hot alarm 1106, hot threshold 1108, cure profile 1110, cold threshold 1112, and cold alarm 1114. Cure profile 1110 comprises temperature profile and times for cure cycle 1100. Cure profile 1110 has ramp section 1116 and hold section 1118.

By executing a cure using cure profile 1110, different portions of a curable material are heated to different temperatures. As depicted, the rate of temperature increase for highest temperature value 1120 is larger than the rate of temperature increase of lowest temperature value 1122. Further, the rate of temperature increase for highest temperature value 1120 is larger than the target rate of temperature increase in ramp section 1116. Distance 1124 between highest temperature value 1120 and lowest temperature value 1122 is greater than distance 1126 between hot alarm 1106 and cold threshold 1112. In this illustrative example, controller mode 5 is configured to maintain all temperature values below hot alarm 1106. Specifically, controller mode 5 is configured to manage heating equipment so that highest temperature value 1120 does not rise above hot alarm 1106. Further, mode 5 is configured to allow lowest temperature value 1122 to fall below cold alarm 1114 if necessary to keep highest temperature value 1120 below hot alarm 1106.

In traditional cure controller systems, the cure may be directed using the temperature profile. In contrast, in this illustrative example, a controller uses hot alarm 1106 to control the cure rather than the temperature profile. As a result, in this illustrative example, the heater setting used by the controller may be different than one based on the temperature profile of cure profile 1110.

Figure 12:
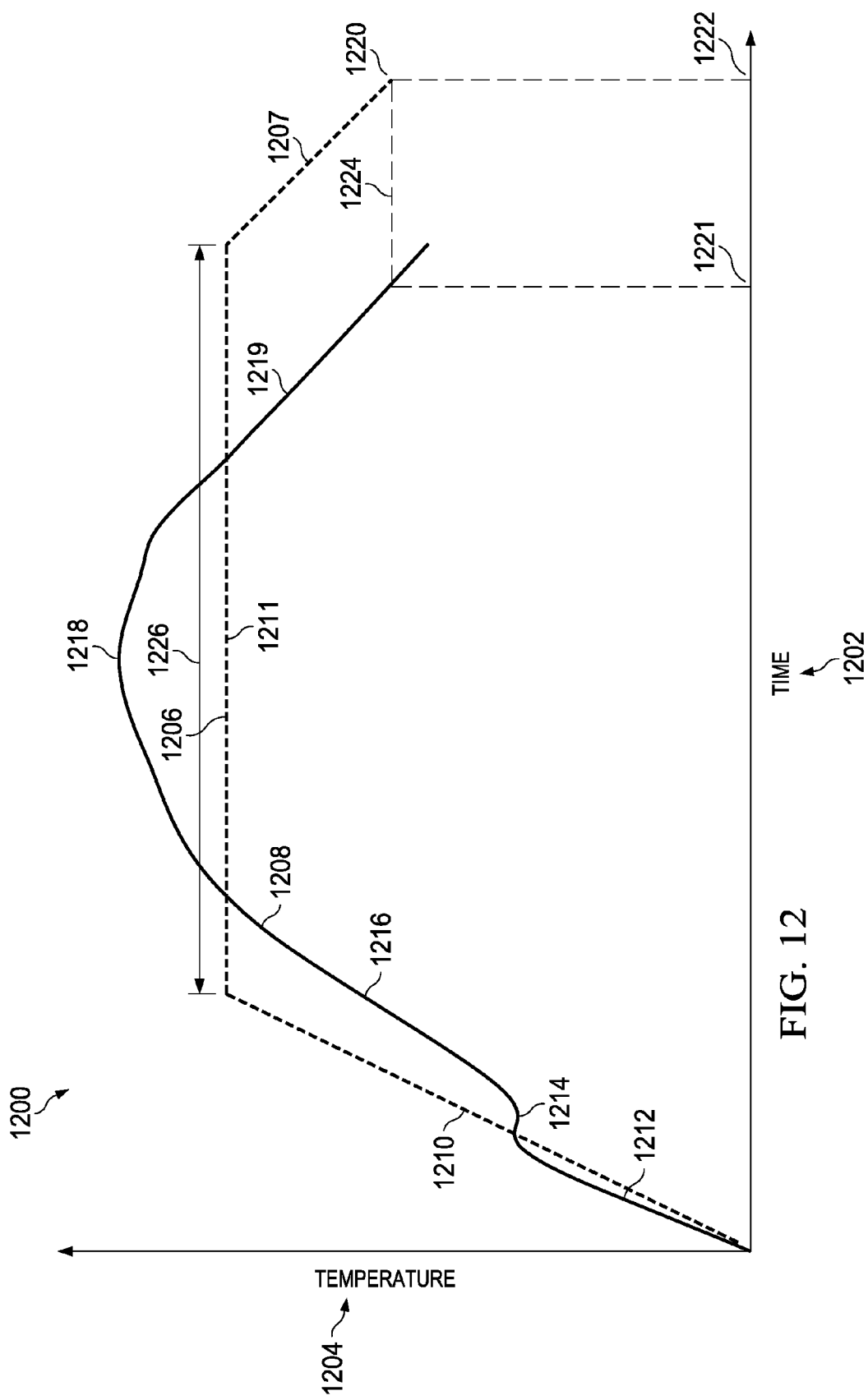
FIG. 12 is an illustration of a nontraditional cure profile in accordance with an illustrative embodiment.

Turning now to FIG. 12, an illustration of a nontraditional cure profile is depicted in accordance with an illustrative embodiment. Cure cycle 1200 of FIG. 12 may be performed in manufacturing environment 300 of FIG. 3.

Cure cycle 1200 has x-axis 1202 and y-axis 1204. X-axis 1202 depicts time of the cure while y-axis 1204 depicts temperature of the cure.

Traditional cure profile 1206 of cure cycle 1200 is demonstrative of a conventional profile used for curing curable materials. Cure profile 1208 is demonstrative of a profile which may be used to cure curable materials using cure controller 308 of FIG. 3. Conventional controllers may not be capable of performing a cure using cure profile 1208.

As depicted, traditional cure profile 1206 has ramp section 1210, hold section 1211, and cool down 1207. Hold section 1211 extends for time 1226. Time 1226 may be undesirably long. Further, time 1226 may be longer than necessary to cure a curable material.

Cure profile 1208 may be configured to use less time to cure a curable material than traditional cure profile 1206. However, cure profile 1208 is more complicated than traditional cure profile 1206. Cure profile 1208 has ramp section 1212, hold section 1214, ramp section 1216, peak 1218, and cool down 1219. Hold section 1214 may allow a cure controller such as cure controller 308 of FIG. 3 to determine whether a curable material may fail to cure using cure profile 1208. Hold section 1214 may allow a cure controller to determine whether a curable material may fail to cure using cure profile 1208 by testing the thermal response of the structure 312.

In some illustrative examples, the cure controller may determine if a curable material may fail to cure by using cure parameters during hold section 1214. In one illustrative example, if a difference between highest temperature value and lowest temperature value is higher than a pre-determined value, the curable material may be identified as likely to fail. In one illustrative example, if a lowest temperature value is lower than a pre-determined value, the curable material may be identified as likely to fail. In these illustrative examples, the pre-determined values may be cure parameters, such as a hot alarm, cold alarm, and other suitable cure parameters.

In some illustrative examples, the cure controller may stop the cure in response to determining the curable material may be likely to fail. By stopping the cure during hold section 1214, the curable material may be removed prior to full cure. Removing a curable material before full cure may save time by not completing cure cycle 1200. Further, removing a curable material before full cure may be easier than removing a fully cured curable material.

As depicted, cure profile 1208 reaches temperature 1220 during cool down 1219 at time 1221. Traditional cure profile 1206 reaches temperature 1220 during cool down 1207 at time 1222. The distance between time 1221 and time 1222 is difference 1224. As depicted, cool down 1219 and cool down 1207 have substantially the same slope. As a result, difference 1224 may be approximately the difference in time between completion of a cure using traditional cure profile 1206 and cure profile 1208. As can be seen from FIG. 12, a substantial time savings may be accomplished using cure profile 1208 rather than traditional cure profile 1206.

Figure 13:
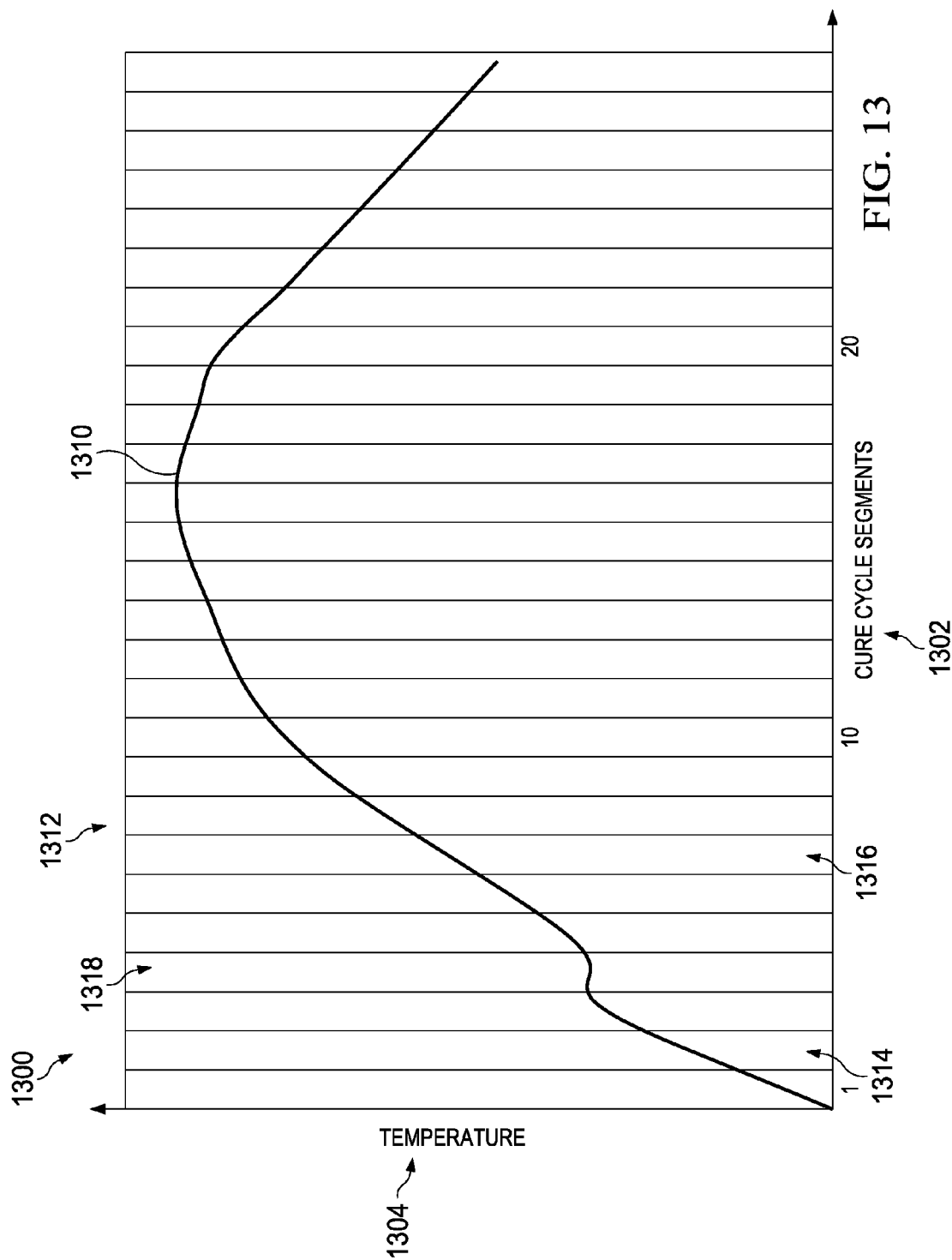
FIG. 13 is an illustration of a cure cycle having segments in accordance with an illustrative embodiment.

Turning now to FIG. 13, an illustration of a cure cycle having segments is depicted in accordance with an illustrative embodiment. Cure cycle 1300 of FIG. 13 may be performed in manufacturing environment 300 of FIG. 3.

Cure cycle 1300 has x-axis 1302 and y-axis 1304. X-axis 1302 depicts time in terms of cure cycle segment number while y-axis 1304 depicts temperature of the cure.

Cure cycle 1300 has cure profile 1310. Cure profile 1310 is broken into plurality of segments 1312. As depicted, plurality of segments 1312 comprises ramp segments and hold segments. Segment 1314 is a ramp segment. Segment 1316 is a ramp segment. Segment 1318 is a hold segment. As depicted, segment 1318 comprises a hold segment between two ramp segments.

As depicted, plurality of segments 1312 contains more than 20 segments. However, in some illustrative examples, plurality of segments 1312 may contain fewer than 20 segments. In some other illustrative examples, plurality of segments 1312 may contain substantially more than 20 segments.

Further, as depicted, segments of plurality of segments 1312 each are substantially the same length of time. However, in some illustrative examples, segments of plurality of segments 1312 may comprise different lengths of time.

Yet further, as depicted, cure profile 1310 is a non-traditional cure profile. Portions of cure profile 1310 in some segments of plurality of segments 1312 may be linear. Portions of cure profile 1310 in some segments of plurality of segments 1312 may be non-linear. This illustrative example is not meant to imply physical or architectural limitations to the manner in which an illustrative embodiment may be implemented. In some illustrative examples, cure profile 1310 may be linear, non-linear, or substantially non-linear. In these illustrative examples, portions of cure profile 1310 in each segment of plurality of segments 1312 may be selected from at least one of a linear, non-linear, substantially non-linear, curved, or any other suitable shape.

When a cure is performed according to cure profile 1310, the cure may not meet desired parameters. If the cure does not meet desired parameters, segment extensions may be added to cure profile 1310.

In some illustrative examples, a cure may not meet desired parameters if a segment in plurality of segments 1312 fails to meet a target degree of cure for the segment. In some illustrative examples, a cure may not meet desired parameters if a lowest temperature falls below a cold threshold. If a cure does not meet desired parameters within a segment in plurality of segments 1312, a segment extension may be added to cure profile 1310.

Figure 14:
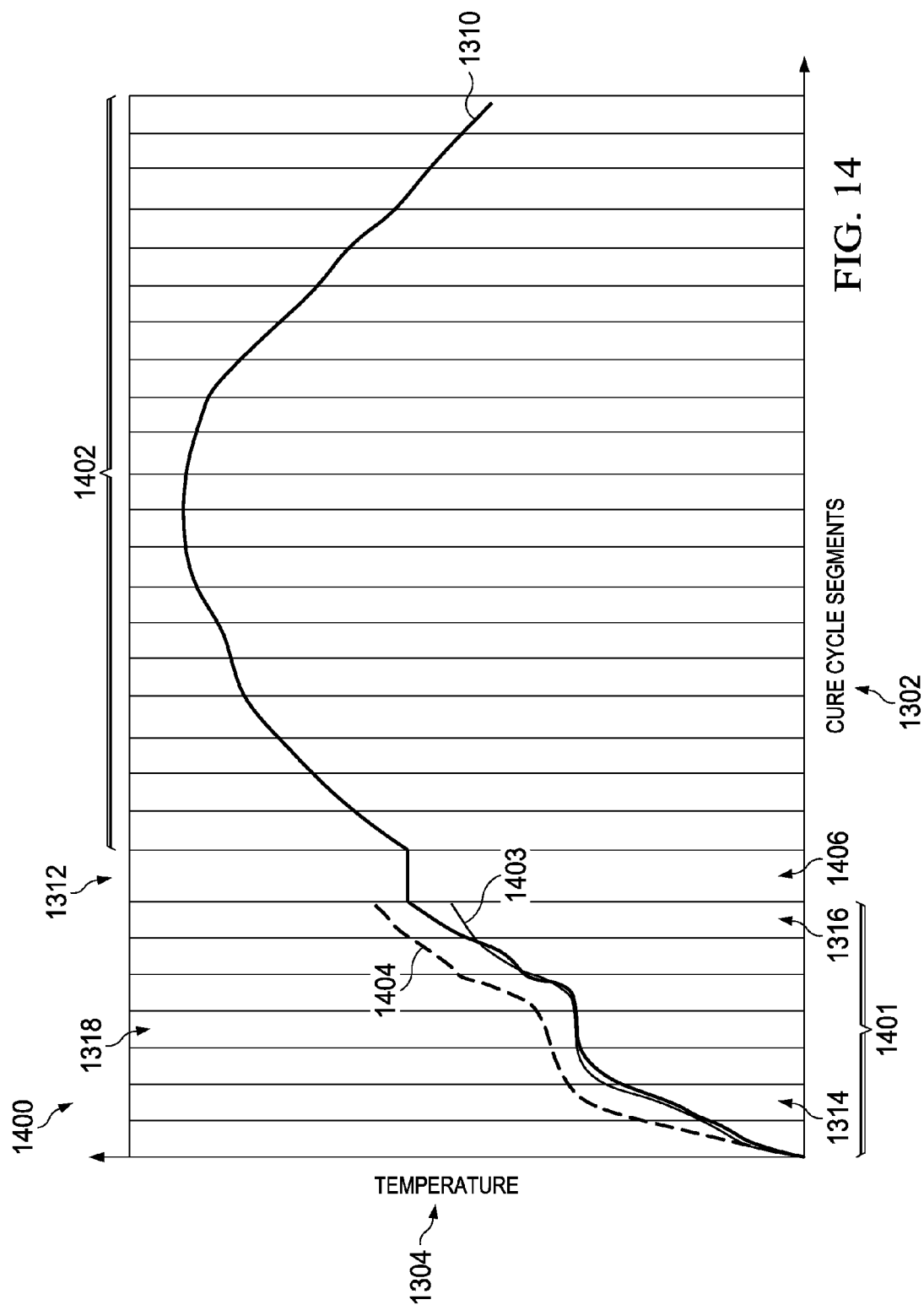
FIG. 14 is another illustration of a cure cycle having segments during a cure in accordance with an illustrative embodiment.

Turning now to FIG. 14, an illustration of a cure cycle having segments during a cure is depicted in accordance with an illustrative embodiment. Specifically, an illustration of performing a cure using cure cycle 1300 having plurality of segments 1312 is depicted in accordance with an illustrative embodiment. Cure cycle 1300 of FIG. 12 may be performed in manufacturing environment 300 of FIG. 3.

As depicted, first seven segments 1401 of plurality of segments 1312 have been performed according to cure cycle 1300. As depicted, remaining segments 1402 of plurality of segments 1312 have not yet been performed according to cure cycle 1300.

As the cure is performed using cure profile 1310, temperature measurements are taken periodically. These temperature measurements may be used to obtain temperature values. Cure cycle 1400 depicts lowest temperature measurement 1403 and highest temperature measurement 1404 during the cure.

In some illustrative examples, temperature measurements may be taken at regular intervals. In some illustrative examples, temperature measurements may be taken every second. In some illustrative examples, temperature measurements may be taken every few seconds, every minute, every few minutes, or at other suitable intervals. In some illustrative examples, different intervals for temperature measurements may be set for each segment in segments 1312. In some illustrative examples, the same interval for temperature measurements may be used throughout cure profile 1310.

As depicted, lowest temperature value 1403 nearly tracks cure profile 1310 in the first six segments in first seven segments 1401 of plurality of segments 1312. Highest temperature value 1404 remains substantially the same distance above cure profile 1310 through the first six segments in first seven segments 1401 of cure profile 1310. However, in segment 1316, lowest temperature value 1403 falls significantly below temperature profile of cure profile 1310.

As discussed in detail below in FIG. 16, lower temperatures may use a longer time than higher temperatures to achieve the same degree of cure. As lowest temperature value 1403 falls significantly below the temperature profile of cure profile 1310, segment 1316 may not meet its target degree of cure. In this illustrative example, an achieved degree of cure for segment 1316 may be determined as segment 1316 is performed according to cure profile 1310. The achieved degree of cure for segment 1316 may then be compared to the target degree of cure for segment 1316.

In some illustrative examples, a degree cure contribution may be determined for each temperature value of segment 1316. In some illustrative examples, a degree cure contribution may be determined based on each temperature value of lowest temperature value 1403 within segment 1316. A degree contribution for a temperature value may be determined using an appropriate cure kinetic curve, such as cure kinetic curve 1600 of FIG. 16. These degree cure contributions may be summed to a total achieved degree of cure for segment 1316. This total achieved degree of cure for segment 1316 may then be compared to the target degree of cure for segment 1316. If the achieved degree of cure is less than the target degree of cure for segment 1316, a segment extension may be added after segment 1316.

As depicted, segment extension 1406 is added after segment 1316. In some illustrative examples, segment extension 1406 is configured to contribute a degree of cure approximately the same as the difference between the achieved degree of cure and the target degree of cure for segment 1316. Characteristics of segment extension 1406, such as a respective time and respective target temperature may be configured to contribute a degree of cure equivalent to the difference. In some illustrative examples, a time for segment extension 1406 may be determined based on a suitable cure kinetic curve and the value of lowest temperature value 1403 during the segment 1316.

Temperature measurements may be taken periodically throughout segment extension 1406. As a result, an achieved degree of cure may be determined for segment extension 1406. If segment extension 1406 fails to meet the target degree of cure for segment extension 1406, an additional segment extension may be added following segment extension 1406.

The remaining segments of plurality of segments 1312 may be performed after segment extension 1406. As can be seen from FIG. 14, addition of segment extension 1406 increases the time of cure cycle 1300.

Figure 15:
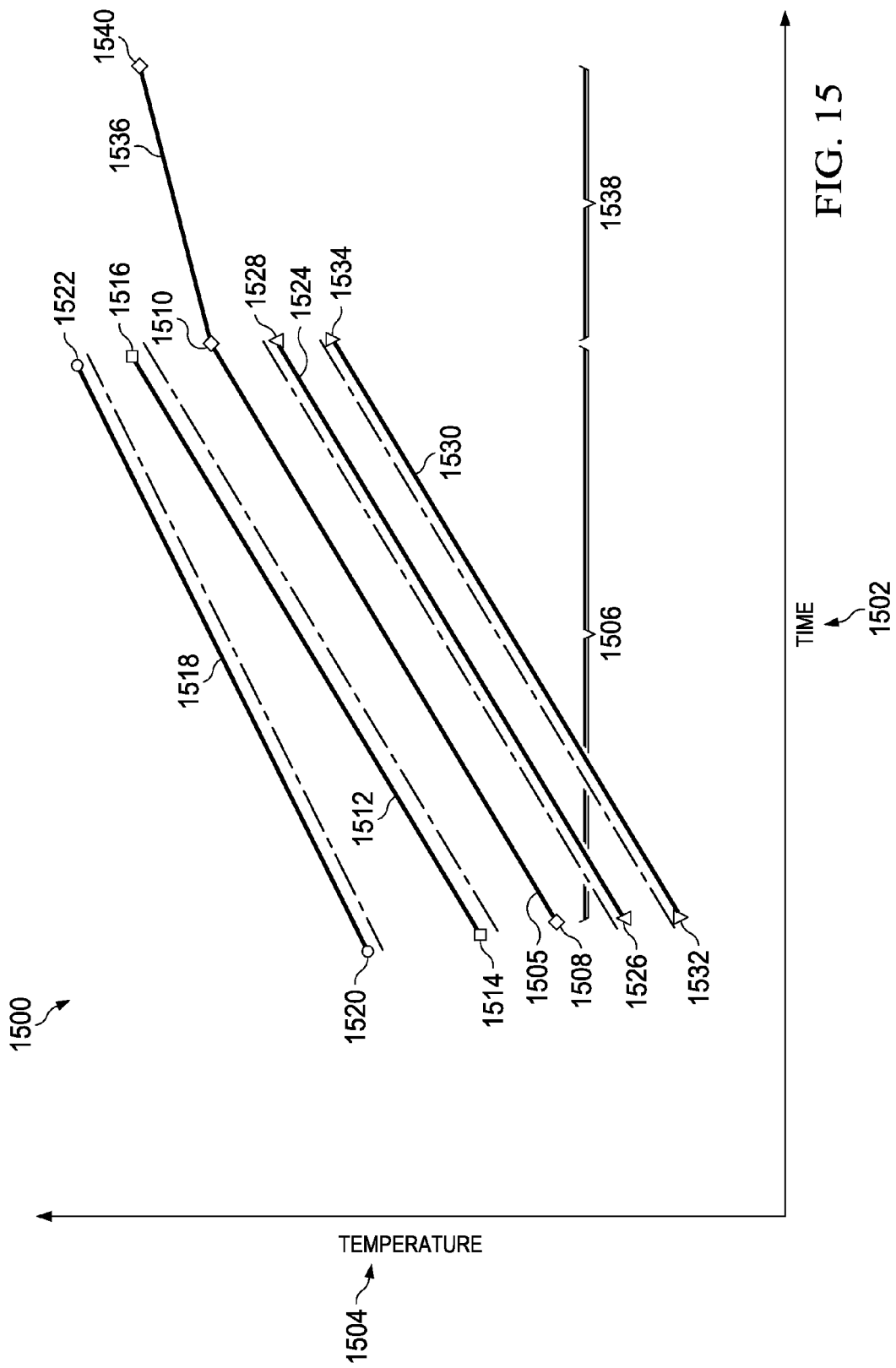
FIG. 15 is an illustration of a single segment of a cure cycle in accordance with an illustrative embodiment.

Turning now to FIG. 15, an illustration of a single segment of a cure cycle is depicted in accordance with an illustrative embodiment. Segment 1500 of FIG. 15 may be performed in manufacturing environment 300 of FIG. 3.

Segment 1500 has x-axis 1502 and y-axis 1504. X-axis 1502 depicts time of the cure while y-axis 1504 depicts temperature of the cure.

Segment 1500 has cure profile segment 1505, hot threshold 1512, hot alarm 1518, cold threshold 1524, cold alarm 1530, and cure segment extension 1536.

Cure profile segment 1505 executes for time 1506. During segment 1500, cure profile segment 1505 increases in temperature from temperature 1508 to temperature 1510 over time 1506. Segment 1500 also has hot threshold 1512.

Like cure profile segment 1505, hot threshold 1512 increases in temperature during time 1506. Hot threshold 1512 increases from temperature 1514 to temperature 1516 over time 1506. Hot alarm 1518 increases from temperature 1520 to temperature 1522 during time 1506. Cold threshold 1524 increases from temperature 1526 to temperature 1528 during time 1506. Cold alarm 1530 increases from temperature 1532 to temperature 1534 during time 1506.

In this illustrative example, segment 1500 also includes cure segment extension 1536. Cure segment extension 1536 increases from temperature 1510 to temperature 1540 over time 1538. Cure segment extension 1536 may be added to cure profile segment 1505 if a lowest temperature reading breaches at least one of cold threshold 1524 or cold alarm 1530 during time 1506. Cure segment extension 1536 may be added to cure profile segment 1505 if cure profile segment 1505 fails to achieve its target degree of cure. In some illustrative examples, cure segment extension 1536 may be configured to provide a degree of cure equivalent to the difference between an achieved degree of cure and the target degree of cure for cure profile segment 1505.

As depicted, the slope of cure profile segment 1505 is greater than the slope of cure segment extension 1536. In other words, the rate of increase of temperature in cure profile segment 1505 is greater than the rate of increase of temperature in cure segment extension 1536. A slower rate of increase of temperature may cause a slower rate of increase in difference between a highest temperature value and a lowest temperature value. As a result, cure segment extension 1536 may allow a lowest temperature value an opportunity to rise to a desirable value. In some illustrative examples, cure segment extension 1536 may cause a lowest temperature value to reach a desirable value without substantially increasing a distance between a highest temperature value and the lowest temperature value. Although the slope of segment extension 1536 is depicted as less than the slope of cure profile segment 1505, in some illustrative examples, the slope of segment extension 1536 may be greater than or equal to the slope of cure profile segment 1505.

Figure 16:
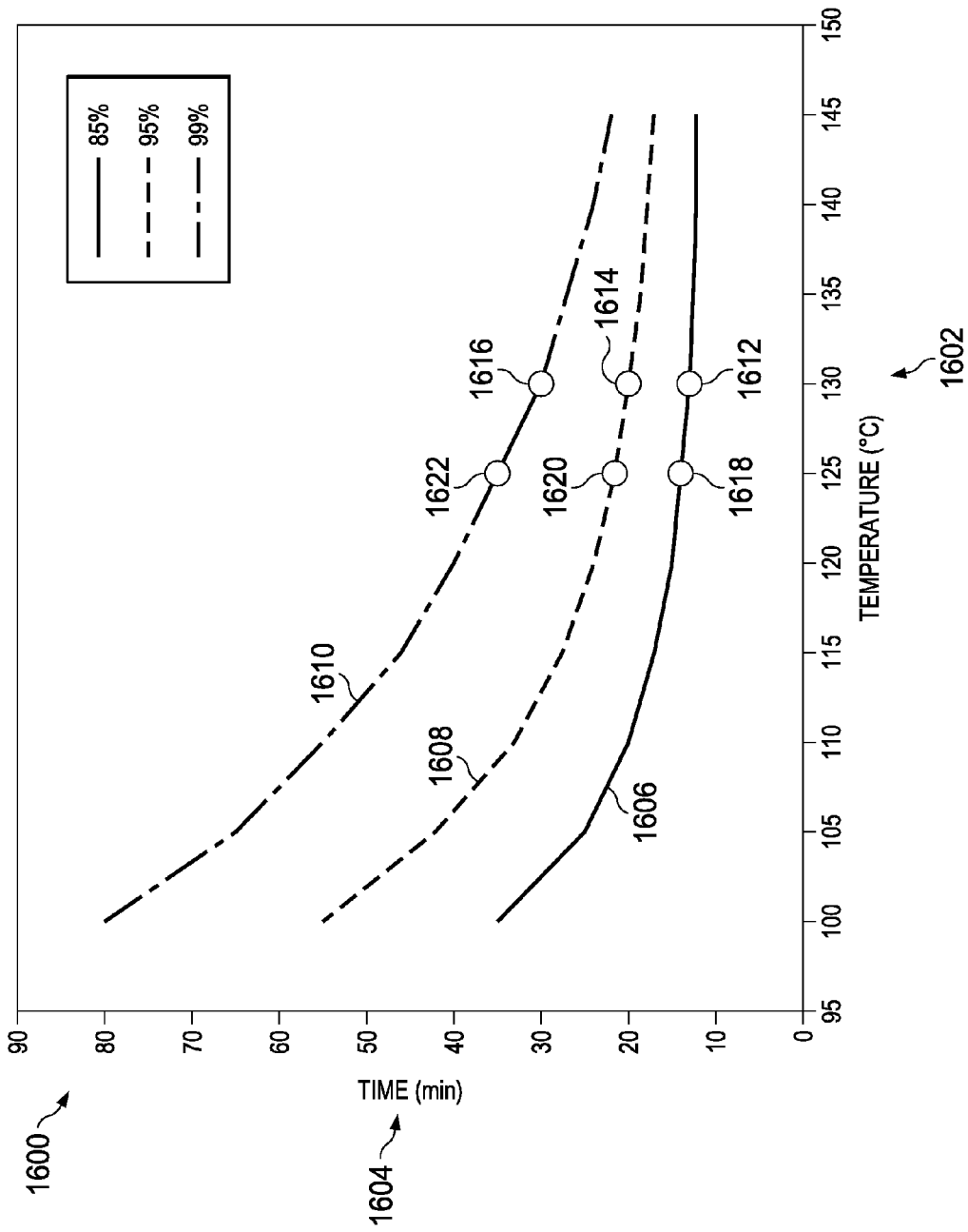
FIG. 16 is an illustration of a cure kinetic curve in accordance with an illustrative embodiment.

Turning now to FIG. 16, an illustration of cure kinetic curves are depicted in accordance with an illustrative embodiment. In this illustrative example, cure kinetic curves 1600 in FIG. 16 may be implemented in manufacturing environment 300 in FIG. 3. Specifically, cure kinetic curves 1600 in FIG. 16 may be used to determine at least one of cure parameters 324, settings for segment extensions 348, and time 370 and temperature profile 368 of cure profile 344 in FIG. 3.

Cure kinetic curves 1600 are a series of curves at different degrees of cures for a specific curable material. Each curable material will have a different series of cure kinetic curves. Cure kinetic curve 1600 has x-axis 1602 and y-axis 1604. As depicted, x-axis 1602 represents the temperature at which the cure is performed. As depicted, y-axis 1604 represents the time for which the cure is performed.

Cure kinetic curves 1600 are for a specific pre-existing degree of cure. In one illustrative example, cure kinetic curves 1600 may represent 0% pre-existing degrees of cure. In some illustrative examples, cure kinetic curves 1600 may be combined with a series of two-dimensional cure kinetic curves for the same curable material at other pre-existing degrees of cure to form a three-dimensional cure kinetic curve. The third axis of this three-dimensional curve would be an existing degree of cure. This third axis takes into account a degree of cure which has occurred previously.

Although cure kinetic curves 1600 depict only three curves, an infinite number of additional curves may be created that define the whole cure profile space. In some illustrative examples, cure kinetic curves 1600 may be more or less than three curves.

Curve 1606 is a curve representing about 85% degree of cure of the curable material. Curve 1608 is a curve representing about 95% degree of cure of the curable material. Curve 1610 is a curve representing about 99% degree of cure of the curable material.

As depicted in curve 1606 at point 1612, in order to achieve about 85% degree of cure of the curable material at about 130 degrees Celsius, the cure should be carried out for about 13 minutes. As depicted in curve 1608 at point 1614, in order to achieve about 95% degree of cure of the curable material at 130 degrees Celsius, the cure should be carried out for about 20 minutes. As depicted in curve 1610 at point 1616, in order to achieve about 99% degree of cure of the curable material at 130 degrees Celsius, the cure should be carried out for about 30 minutes.

As depicted in curve 1606 at point 1618, in order to achieve about 85% degree of cure of the curable material at about 130 degrees Celsius, the cure should be carried out for about 14 minutes. As depicted in curve 1608 at point 1620, in order to achieve about 95% degree of cure of the curable material at 130 degrees Celsius, the cure should be carried out for about 21.5 minutes. As depicted in curve 1610 at point 1622, in order to achieve about 99% degree of cure of the curable material at 130 degrees Celsius, the cure should be carried out for about 35 minutes.

As can be seen from cure kinetic curves 1600, to achieve the same degree of degree of cure at a lower temperature, a higher amount of time is used. As a result, if a lowest temperature of a curable material is below a target temperature during a segment of a cure profile, that segment may not reach a target degree of cure during the segment. In some illustrative examples, if a segment does not reach a target degree of cure, a segment extension may be added after the segment such that the segment and the segment extension together achieve at least the target degree of cure for the segment.

In some illustrative examples, time 370 and temperature profile 368 of cure profile 344 in FIG. 3 may be determined based on cure kinetic curves 1600. Specifically, time 370 and temperature profile 368 may be related such that curable material 316 reaches about 99% degree of cure.

Further, in some illustrative examples, settings for segment extensions 348 may be determined based on cure kinetic curves 1600. In one illustrative example, a segment in segments 346 may not reach respective target degree of cure in total degree of cure 349. The achieved degree of cure for the segment may be determined based on cure kinetic curves 1600. In some illustrative examples, an achieved degree of cure for a period of time at a specific temperature may be determined by selecting an appropriate curve from cure kinetic curves 1600, and comparing a time for the appropriate curve at the specific temperature to the period of time.

Settings for a segment extension in segment extensions 348 may be determined based on the difference between the achieved degree of cure and the target degree of cure. A time and target temperature for the segment extension may be determined based on cure kinetic curves 1600. The segment extension may be executed based on the time and target temperature. As a result, the segment may reach the target degree of cure for the segment.

In another illustrative example, achieved degree of cure may be determined based on the summation of the cure profile executed thus far rather than a single segment. Settings for a segment extension in segment extensions 348 may be determined based on the difference between the achieved degree of cure and the target degree of cure for the portion of the cure profile executed thus far. As a result, executing a segment extension may cause the cure profile to reach the target degree of cure for the cure profile executed thus far.

Turning now to FIG. 17, an illustration of a flowchart of a process for controlling a cure is depicted in accordance with an illustrative embodiment. Process 1700 of FIG. 17 may be performed in manufacturing environment 300 of FIG. 3.

The process begins by initiating a cure of a curable material by using a cure profile and cure parameters (operation 1702). The cure parameters are based on material data related to curing the curable material. Next, the process obtains temperature values based on temperatures measured periodically during the cure by a plurality of sensors (operation 1704). The process then adjusts a cure setting based on at least one cure parameter of the cure parameters and at least one temperature value to substantially maintain a desired effect (operation 1706). The cure parameters comprise a hot threshold, a cold threshold, a hot alarm, and a cold alarm. The process then terminates.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, in FIGS. 5A and 5B, a hot threshold flag may be set prior to determining if at least one temperature value is below the cold threshold. In another illustrative example, operation 516, operation 518, and operation 520 may not be present. In some illustrative examples, process 500 may further include steps to determine if at least one temperature value exceeds the hot alarm and to automatically stop the cure process if at least one temperature value does exceed the hot alarm. In yet another illustrative example, process 500 may not use a hot threshold flag. In this illustrative example, it may be said that the hot threshold has priority over the cold threshold. In this illustrative example, if at least one temperature value is near or exceeds the hot threshold, a mode concerned with the hot threshold will always be selected.

In another illustrative example, operation 508, operation 526, and other determination operations may only determine if a temperature value exceeds a threshold. In these illustrative examples, the determination operations may not determine if a temperature value is near a threshold.

Illustrative embodiments of the disclosure may be described in the context of aircraft manufacturing and service method 1800 as shown in FIG. 18 and aircraft 1900 as shown in FIG. 19. Turning first to FIG. 18, an illustration of an aircraft manufacturing and service method is depicted in the form of a block diagram in accordance with an illustrative embodiment. During pre-production, aircraft manufacturing and service method 1800 may include specification and design 1802 of aircraft 1900 in FIG. 19 and material procurement 1804.

During production, component and subassembly manufacturing 1806 and system integration 1808 of aircraft 1900 in FIG. 19 takes place. Thereafter, aircraft 1900 in FIG. 19 may go through certification and delivery 1810 in order to be placed in service 1812. While in service 1812 by a customer, aircraft 1900 in FIG. 19 is scheduled for routine maintenance and service 1814, which may include modification, reconfiguration, refurbishment, and other maintenance or service.

Each of the processes of aircraft manufacturing and service method 1800 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 19, an illustration of an aircraft is depicted in the form of a block diagram in which an illustrative embodiment may be implemented. In this example, aircraft 1900 is produced by aircraft manufacturing and service method 1800 in FIG. 18 and may include airframe 1902 with plurality of systems 1904 and interior 1906. Examples of systems 1904 include one or more of propulsion system 1908, electrical system 1910, hydraulic system 1912, and environmental system 1918. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1800 in FIG. 18. One or more illustrative embodiments may be used during component and subassembly manufacturing 1806. For example, cure controller 308 of FIG. 3 may be used during component and subassembly manufacturing 1806. Further, cure controller 308 of FIG. 3 may also be used to perform rework during maintenance and service 1814. For example, rework to a curable skin of aircraft 1900 may be cured using cure controller 308 of FIG. 3 during scheduled maintenance for aircraft 1900.

The illustrative examples may provide a method and apparatus for cure control of curable materials. In particular, the illustrative embodiments may provide a method and apparatus for curing curable materials in a decreased amount of time compared to traditional cure cycles. Yet further, the illustrative examples may provide a cure controller configured to manage a plurality of exception conditions without human intervention.

The illustrative examples may provide a cure controller configured to identify cure parameters based on material properties of a curable material. The illustrative examples further provide a cure controller configured to cure curable materials positioned over different of geometries without knowledge of the geometries. The illustrative examples may provide a cure controller which prioritizes cure parameters when non-uniform temperatures exist in a curable material. The illustrative examples may provide a cure controller which manages a cure such that the curable material may have desirable material properties despite non-uniform temperatures.

The illustrative examples may provide a cure controller configured to change the time of a cure based on the temperature values during the cure. The illustrative examples may provide a cure controller configured to drive a cure based on at least one temperature value and at least one of a hot threshold, a cold threshold, a hot alarm, and cold alarm. The illustrative examples may provide a cure controller capable of controlling a cure according to a nontraditional cure profile. The illustrative examples may provide a cure controller which results in fewer failed cures than a conventional cure controller.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method comprising:
   initiating a cure of a curable material by using a cure profile and cure parameters, the cure parameters based on material data related to curing the curable material;
   obtaining temperature values based on temperatures measured periodically during the cure by a plurality of sensors;
   determining if any temperature value from a single reading from a first sensor in the plurality of sensors is near or exceeds at least one of a cold threshold or a hot threshold; and
   adjusting a cure setting during the cure based on at least one cure parameter of the cure parameters and at least one temperature value of the temperature values to substantially maintain a desired effect, the cure parameters comprising a hot threshold, a cold threshold, a hot alarm, and a cold alarm, wherein adjusting the cure setting comprises, responsive to a determination that no temperature value of the temperature values from the single reading is near or exceeds the cold threshold or the hot threshold, changing a heater setting to cause a difference between a highest temperature value and the hot threshold and a difference between a lowest temperature value and the cold threshold to be a same value.

2. The method of claim 1, wherein determining if the any temperature value from the single reading is near or exceeds at least one of the cold threshold or the hot threshold comprises:
   identifying a highest temperature value and a lowest temperature value from the temperature values from the single reading.

3. The method of claim 1, wherein the cold threshold and the hot threshold vary through the cure.

4. The method of claim 1, wherein adjusting the cure setting based on the at least one cure parameter of the cure parameters and the at least one temperature value of the temperature values comprises:
   responsive to a determination that at least one temperature value of the temperature values from the single reading from the first sensor in the plurality of sensors is near or exceeds the cold threshold, increasing a heater setting despite temperature values from a second sensor in the plurality of sensors exceeding the hot threshold.

5. The method of claim 1, wherein adjusting the cure setting based on the at least one cure parameter of the cure parameters and the at least one temperature value of the temperature values comprises:
   responsive to a determination that at least one temperature value of the temperature values from the single reading from the first sensor in the plurality of sensors is near or exceeds the hot threshold, decreasing a heater setting despite temperature values from a second sensor in the plurality of sensors exceeding the cold threshold.

6. The method of claim 1, wherein adjusting the cure setting based on the at least one cure parameter of the cure parameters and the at least one temperature value comprises:
   responsive to a determination that at least one temperature value of the temperature values from the single reading from the first sensor in the plurality of sensors is near or exceeds the cold threshold, increasing a time for the cure.

7. The method of claim 6 further comprising:
   identifying a new estimated cure time; and
   displaying the new estimated cure time.

8. The method of claim 1 further comprising:
   selecting a controller mode based on a result of the determining step, the controller mode configured to control adjusting the cure setting during the cure.

9. The method of claim 1, wherein the cure profile is divided into a plurality of segments, wherein each of the plurality of segments comprises at least one of a ramp segment or a hold segment.

10. The method of claim 9, wherein the cure profile comprises the hold segment between two ramp segments.

11. The method of claim 9, wherein adjusting the cure setting comprises adding a segment extension after a segment in the plurality of segments.

12. The method of claim 1 further comprising:
terminating the cure if the any temperature value exceeds the hot alarm, wherein the hot alarm indicates a temperature over which an associated structure may be damaged.

13. The method of claim 12 further comprising:
determining if any temperature values from a single reading are near the hot alarm; and
responsive to a determination that at least one temperature value of the temperature values from the single reading from the first sensor in the plurality of sensors is near the hot alarm, decreasing a heater setting despite temperature values from a second sensor in the plurality of sensors falling below at least one of the cold threshold or the cold alarm.

14. The method of claim 1, wherein the curable material comprises a rework patch and wherein curing the curable material results in a completed rework of a structure.

15. A method comprising:
initiating a cure of a curable material by using a cure profile and cure parameters, the cure parameters based on material data related to curing the curable material;
obtaining temperature values based on temperatures measured periodically during the cure by a plurality of sensors;
determining if any temperature value from a single reading from a first sensor in the plurality of sensors is near or exceeds at least one of a cold threshold or a hot threshold; and
adjusting a cure setting during the cure based on at least one cure parameter of the cure parameters and at least one temperature value of the temperature values to substantially maintain a desired effect, the cure parameters comprising a hot threshold, a cold threshold, a hot alarm, and a cold alarm, wherein adjusting the cure setting comprises, responsive to a determination that at least one temperature value of the temperature values from the single reading from the first sensor in the plurality of sensors is near or exceeds the cold threshold, increasing a heater setting despite temperature values from a second sensor in the plurality of sensors exceeding the hot threshold.

16. The method of claim 15, wherein determining if the any temperature value from the single reading is near or exceeds at least one of the cold threshold or the hot threshold comprises:
identifying a highest temperature value and a lowest temperature value from the temperature values from the single reading.

17. The method of claim 15, wherein the cold threshold and the hot threshold vary through the cure.

18. The method of claim 15, wherein adjusting the cure setting based on the at least one cure parameter of the cure parameters and the at least one temperature value of the temperature values comprises:
responsive to a determination that no temperature value of the temperature values from the single reading is near or exceeds the cold threshold or the hot threshold, changing a heater setting to cause a difference between a highest temperature value and the hot threshold and a difference between a lowest temperature value and the cold threshold to be a same value.

19. The method of claim 15, wherein adjusting the cure setting based on the at least one cure parameter of the cure parameters and the at least one temperature value of the temperature values comprises:
responsive to a determination that at least one temperature value of the temperature values from the single reading from the first sensor in the plurality of sensors is near or exceeds the hot threshold, decreasing a heater setting despite temperature values from a second sensor in the plurality of sensors exceeding the cold threshold.

20. The method of claim 15, wherein adjusting the cure setting based on the at least one cure parameter of the cure parameters and the at least one temperature value comprises:
responsive to a determination that at least one temperature value of the temperature values from the single reading from the first sensor in the plurality of sensors is near or exceeds the cold threshold, increasing a time for the cure.

21. The method of claim 20 further comprising:
identifying a new estimated cure time; and
displaying the new estimated cure time.

22. The method of claim 15 further comprising:
selecting a controller mode based on a result of the determining step, the controller mode configured to control adjusting the cure setting during the cure.

23. The method of claim 15, wherein the cure profile is divided into a plurality of segments, wherein each of the plurality of segments comprises at least one of a ramp segment or a hold segment.

24. The method of claim 23, wherein the cure profile comprises the hold segment between two ramp segments.

25. The method of claim 23, wherein adjusting the cure setting comprises adding a segment extension after a segment in the plurality of segments.

26. The method of claim 15 further comprising:
terminating the cure if the any temperature value exceeds the hot alarm, wherein the hot alarm indicates a temperature over which an associated structure may be damaged.

27. The method of claim 26 further comprising:
determining if any temperature values from a single reading are near the hot alarm; and
responsive to a determination that at least one temperature value of the temperature values from the single reading from the first sensor in the plurality of sensors is near the hot alarm, decreasing a heater setting despite temperature values from a second sensor in the plurality of sensors falling below at least one of the cold threshold or the cold alarm.

28. The method of claim 15, wherein the curable material comprises a rework patch and wherein curing the curable material results in a completed rework of a structure.

29. A method comprising:
initiating a cure of a curable material by using a cure profile and cure parameters, the cure parameters based on material data related to curing the curable material;
obtaining temperature values based on temperatures measured periodically during the cure by a plurality of sensors;
determining if any temperature value from a single reading from a first sensor in the plurality of sensors is near or exceeds at least one of a cold threshold or a hot threshold; and
adjusting a cure setting during the cure based on at least one cure parameter of the cure parameters and at least one temperature value of the temperature values to substantially maintain a desired effect, the cure parameters comprising a hot threshold, a cold threshold, a hot alarm, and a cold alarm, wherein adjusting the cure setting comprises, responsive to a determination that at least one temperature value of the temperature values from the single reading from the first sensor in the plurality of sensors is near or exceeds the hot threshold, decreasing a heater setting despite temperature values from a second sensor in the plurality of sensors exceeding the cold threshold.

30. The method of claim 29, wherein determining if the any temperature value from the single reading is near or exceeds at least one of the cold threshold or the hot threshold comprises:
identifying a highest temperature value and a lowest temperature value from the temperature values from the single reading.

31. The method of claim 29, wherein the cold threshold and the hot threshold vary through the cure.

32. The method of claim 29, wherein adjusting the cure setting based on the at least one cure parameter of the cure parameters and the at least one temperature value of the temperature values comprises:
responsive to a determination that no temperature value of the temperature values from the single reading is near or exceeds the cold threshold or the hot threshold, changing a heater setting to cause a difference between a highest temperature value and the hot threshold and a difference between a lowest temperature value and the cold threshold to be a same value.

33. The method of claim 29, wherein adjusting the cure setting based on the at least one cure parameter of the cure parameters and the at least one temperature value of the temperature values comprises:
responsive to a determination that at least one temperature value of the temperature values from the single reading from the first sensor in the plurality of sensors is near or exceeds the cold threshold, increasing a heater setting despite temperature values from a second sensor in the plurality of sensors exceeding the hot threshold.

34. The method of claim 29, wherein adjusting the cure setting based on the at least one cure parameter of the cure parameters and the at least one temperature value comprises:
responsive to a determination that at least one temperature value of the temperature values from the single reading from the first sensor in the plurality of sensors is near or exceeds the cold threshold, increasing a time for the cure.

35. The method of claim 29 further comprising:
identifying a new estimated cure time; and
displaying the new estimated cure time.

36. The method of claim 29 further comprising:
selecting a controller mode based on a result of the determining step, the controller mode configured to control adjusting the cure setting during the cure.

37. The method of claim 29, wherein the cure profile is divided into a plurality of segments, wherein each of the plurality of segments comprises at least one of a ramp segment or a hold segment.

38. The method of claim 37, wherein the cure profile comprises the hold segment between two ramp segments.

39. The method of claim 37, wherein adjusting the cure setting comprises adding a segment extension after a segment in the plurality of segments.

40. The method of claim 29 further comprising:
terminating the cure if the any temperature value exceeds the hot alarm, wherein the hot alarm indicates a temperature over which an associated structure may be damaged.

41. The method of claim 40 further comprising:
determining if any temperature values from a single reading are near the hot alarm; and
responsive to a determination that at least one temperature value of the temperature values from the single reading from the first sensor in the plurality of sensors is near the hot alarm, decreasing a heater setting despite temperature values from a second sensor in the plurality of sensors falling below at least one of the cold threshold or the cold alarm.

42. The method of claim 29, wherein the curable material comprises a rework patch and wherein curing the curable material results in a completed rework of a structure.

43. A method comprising:
initiating a cure of a curable material by using a cure profile and cure parameters, the cure parameters based on material data related to curing the curable material, wherein the cure profile is divided into a plurality of segments, wherein each of the plurality of segments comprises at least one of a ramp segment or a hold segment;
obtaining temperature values based on temperatures measured periodically during the cure by a plurality of sensors;
determining if any temperature value from a single reading from a first sensor in the plurality of sensors is near or exceeds at least one of a cold threshold or a hot threshold; and
adjusting a cure setting during the cure based on at least one cure parameter of the cure parameters and at least one temperature value of the temperature values to substantially maintain a desired effect, the cure parameters comprising a hot threshold, a cold threshold, a hot alarm, and a cold alarm, wherein adjusting the cure setting comprises adding a segment extension after a segment in the plurality of segments.

44. The method of claim 43, wherein determining if the any temperature value from the single reading is near or exceeds at least one of the cold threshold or the hot threshold comprises:
identifying a highest temperature value and a lowest temperature value from the temperature values from the single reading.

45. The method of claim 43, wherein the cold threshold and the hot threshold vary through the cure.

46. The method of claim 43, wherein adjusting the cure setting based on the at least one cure parameter of the cure parameters and the at least one temperature value of the temperature values comprises:
responsive to a determination that no temperature value of the temperature values from the single reading is near or exceeds the cold threshold or the hot threshold, changing a heater setting to cause a difference between a highest temperature value and the hot threshold and a difference between a lowest temperature value and the cold threshold to be a same value.

47. The method of claim 43, wherein adjusting the cure setting based on the at least one cure parameter of the cure parameters and the at least one temperature value of the temperature values comprises:
responsive to a determination that at least one temperature value of the temperature values from the single reading from the first sensor in the plurality of sensors is near or exceeds the cold threshold, increasing a heater setting despite temperature values from a second sensor in the plurality of sensors exceeding the hot threshold.

48. The method of claim 43, wherein adjusting the cure setting based on the at least one cure parameter of the cure parameters and the at least one temperature value of the temperature values comprises:

responsive to a determination that at least one temperature value of the temperature values from the single reading from the first sensor in the plurality of sensors is near or exceeds the hot threshold, decreasing a heater setting despite temperature values from a second sensor in the plurality of sensors exceeding the cold threshold.

49. The method of claim 43, wherein adjusting the cure setting based on the at least one cure parameter of the cure parameters and the at least one temperature value comprises:
responsive to a determination that at least one temperature value of the temperature values from the single reading from the first sensor in the plurality of sensors is near or exceeds the cold threshold, increasing a time for the cure.

50. The method of claim 49 further comprising:
identifying a new estimated cure time; and
displaying the new estimated cure time.

51. The method of claim 43 further comprising:
selecting a controller mode based on a result of the determining step, the controller mode configured to control adjusting the cure setting during the cure.

52. The method of claim 43, wherein the cure profile comprises the hold segment between two ramp segments.

53. The method of claim 43 further comprising:
terminating the cure if the any temperature value exceeds the hot alarm, wherein the hot alarm indicates a temperature over which an associated structure may be damaged.

54. The method of claim 53 further comprising:
determining if any temperature values from a single reading are near the hot alarm; and
responsive to a determination that at least one temperature value of the temperature values from the single reading from the first sensor in the plurality of sensors is near the hot alarm, decreasing a heater setting despite temperature values from a second sensor in the plurality of sensors falling below at least one of the cold threshold or the cold alarm.

55. The method of claim 43, wherein the curable material comprises a rework patch and wherein curing the curable material results in a completed rework of a structure.

* * * * *